Figure 1A:
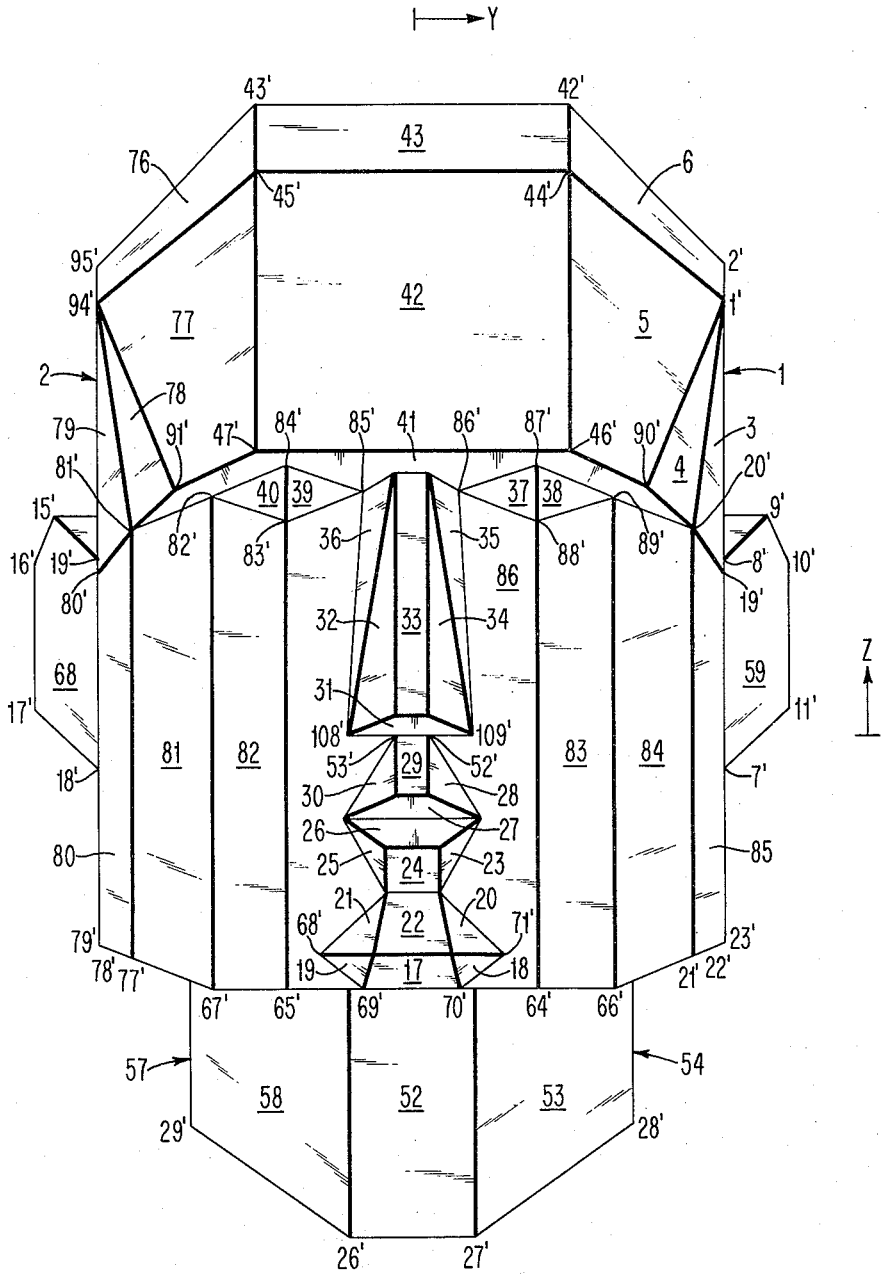
Figure 1B:
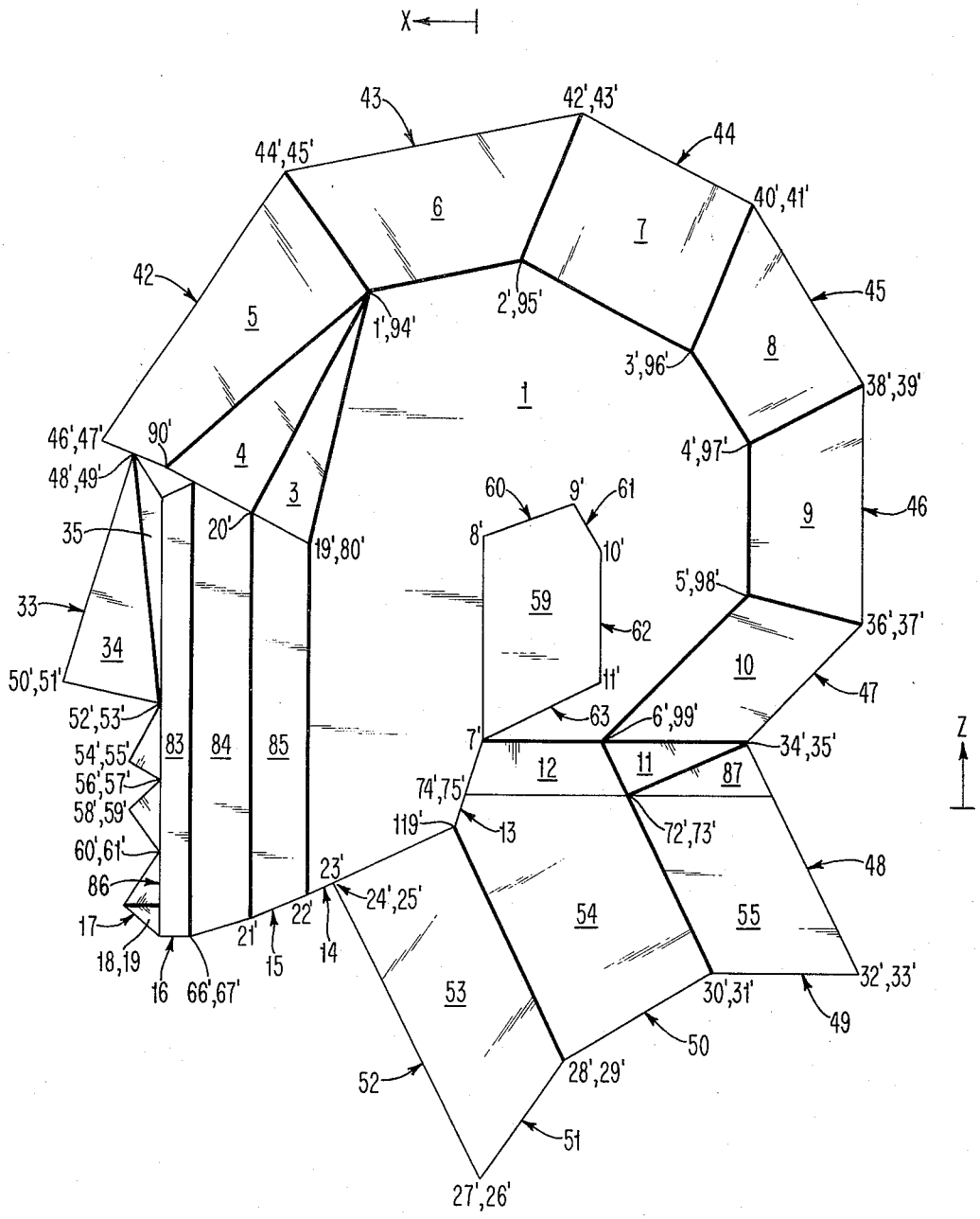
Figure 1C:
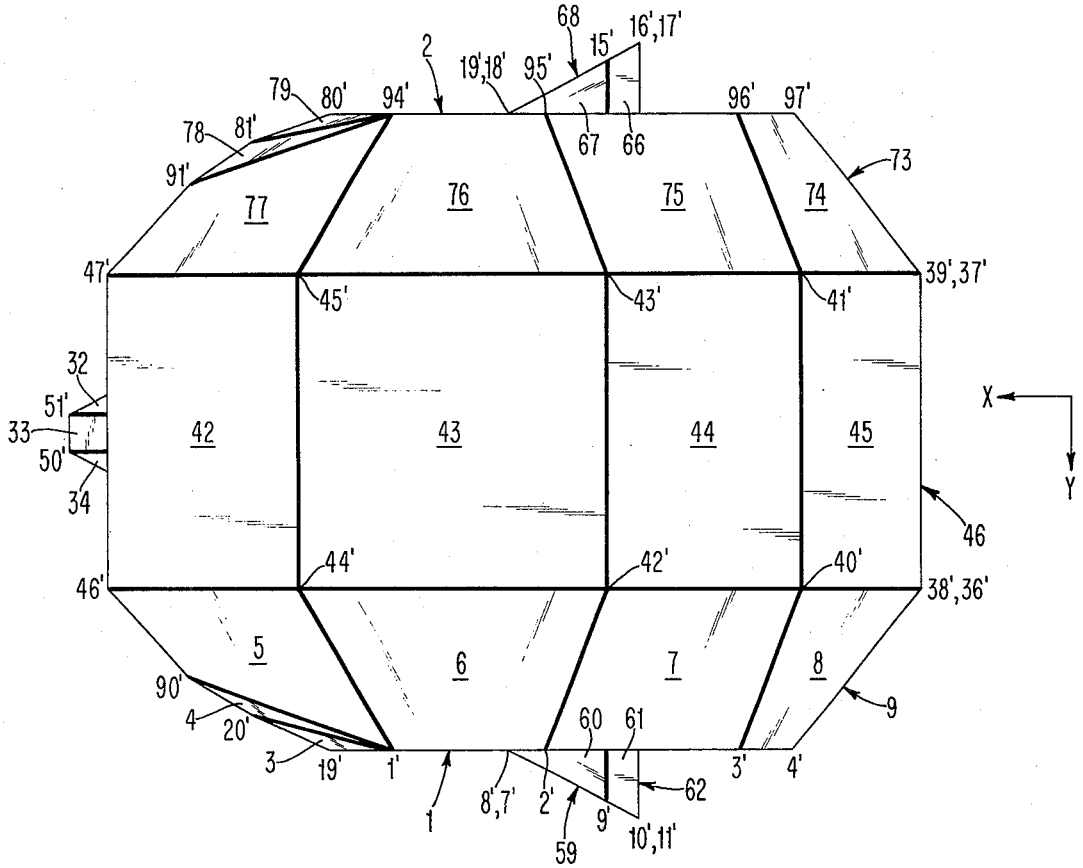
Figure 2:
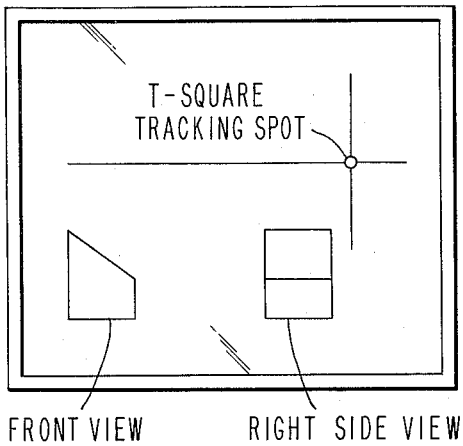
Figure 3:
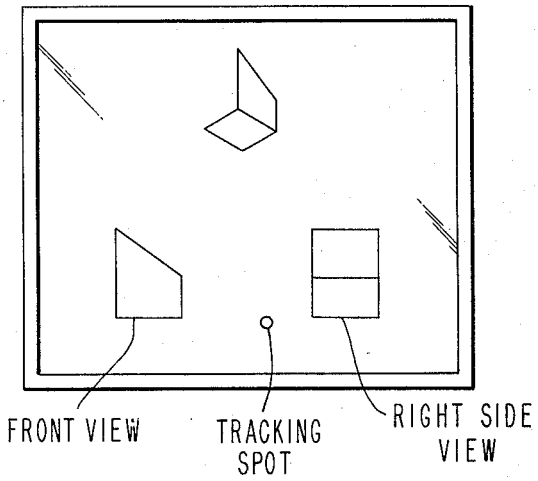
Figure 4:
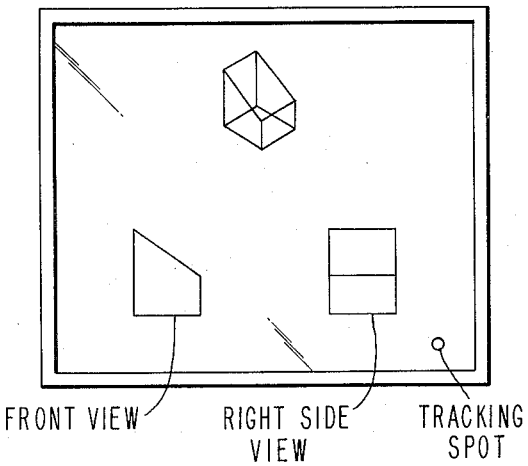
Figure 5:
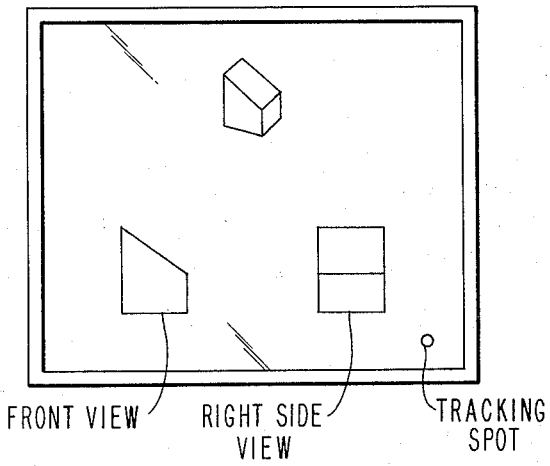
Figure 6:
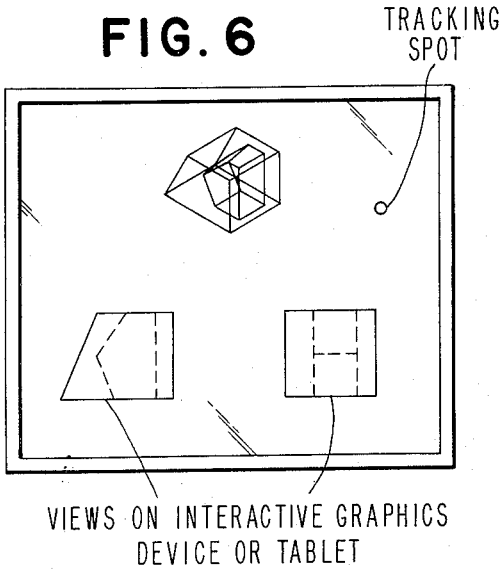
Figure 7:
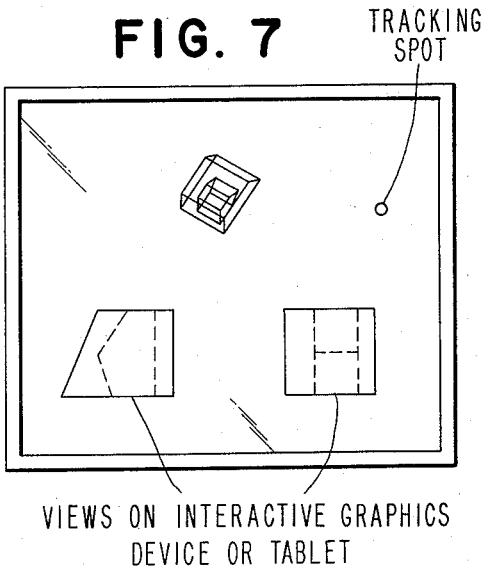
Figure 8B:
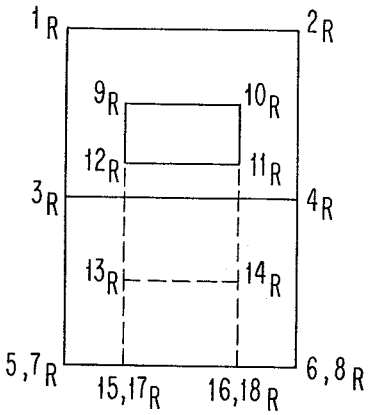
Figure 8A:
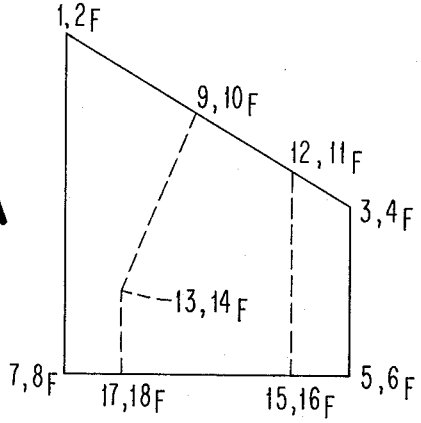
Figure 9:
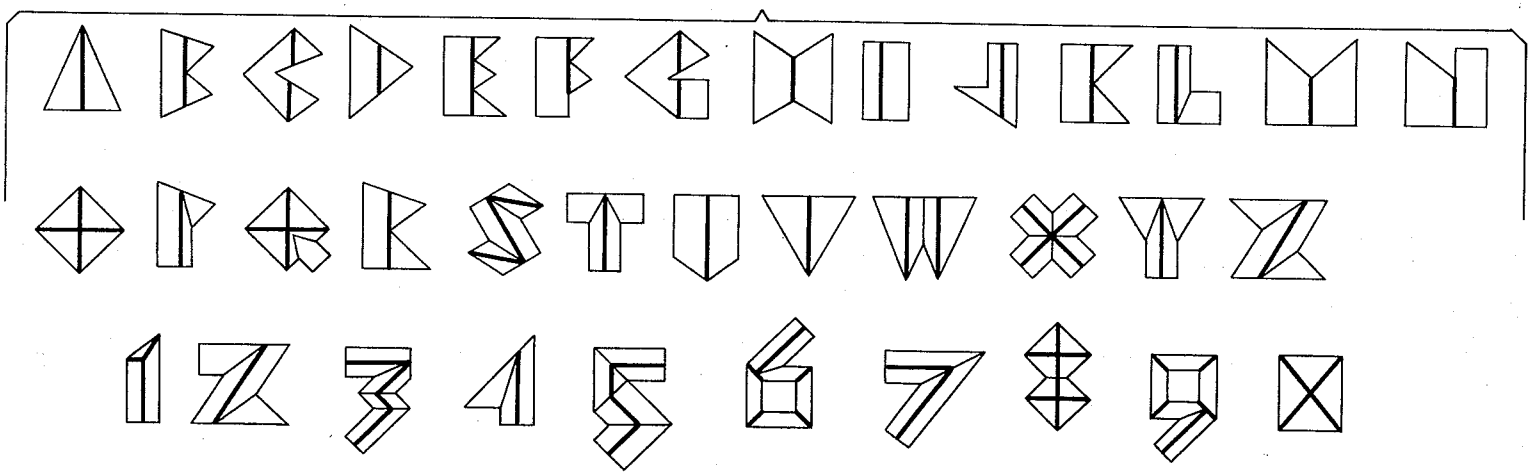
Figure 10:
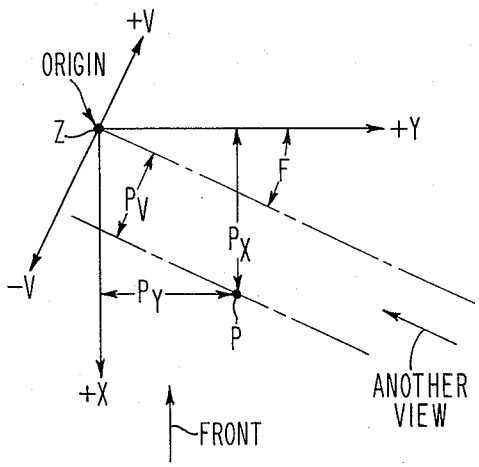
Figure 11:
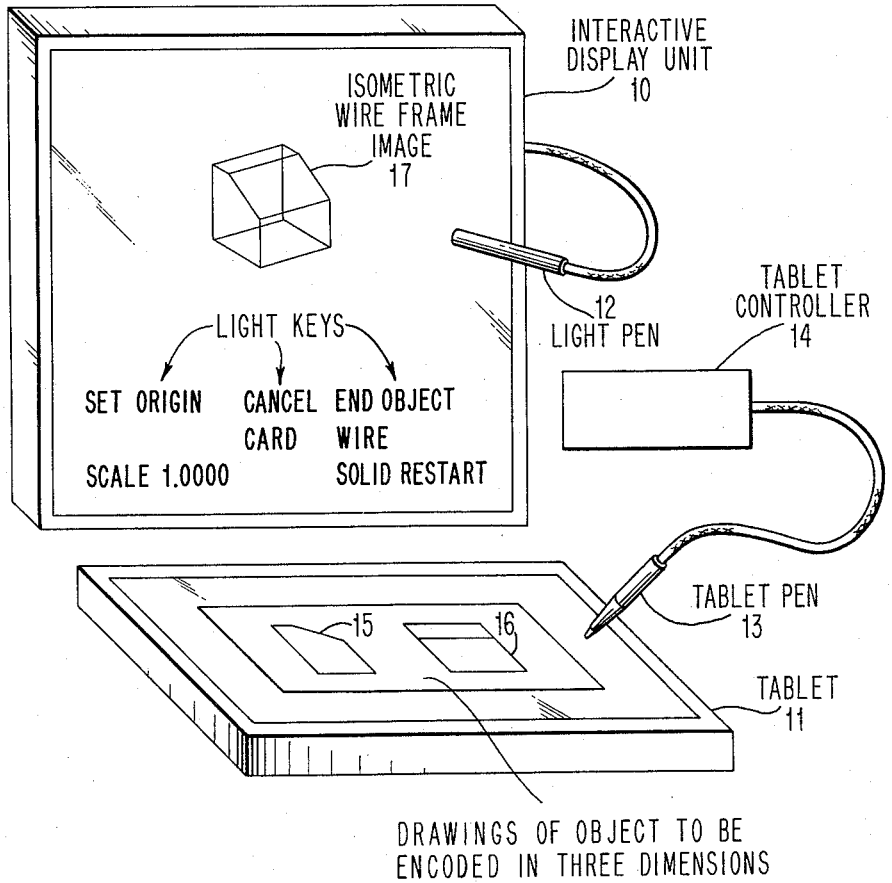
Figure 12:
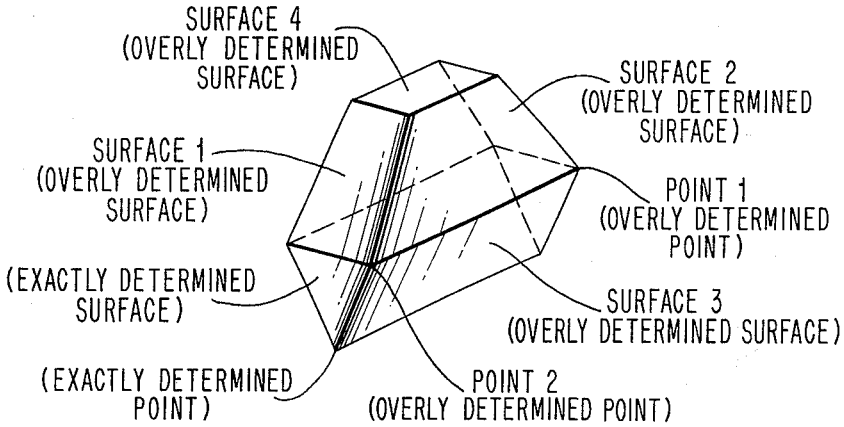
Figure 15:
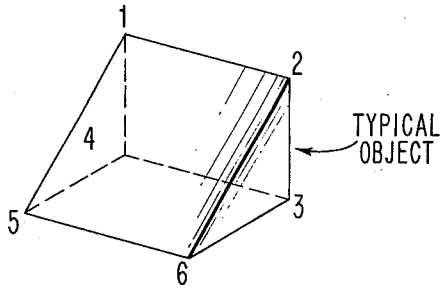
Figure 16:
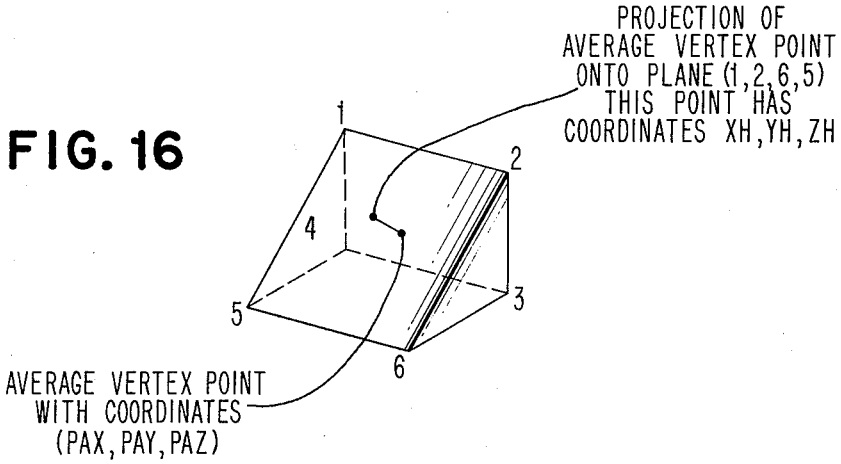
Figures 13, 13A, 14:
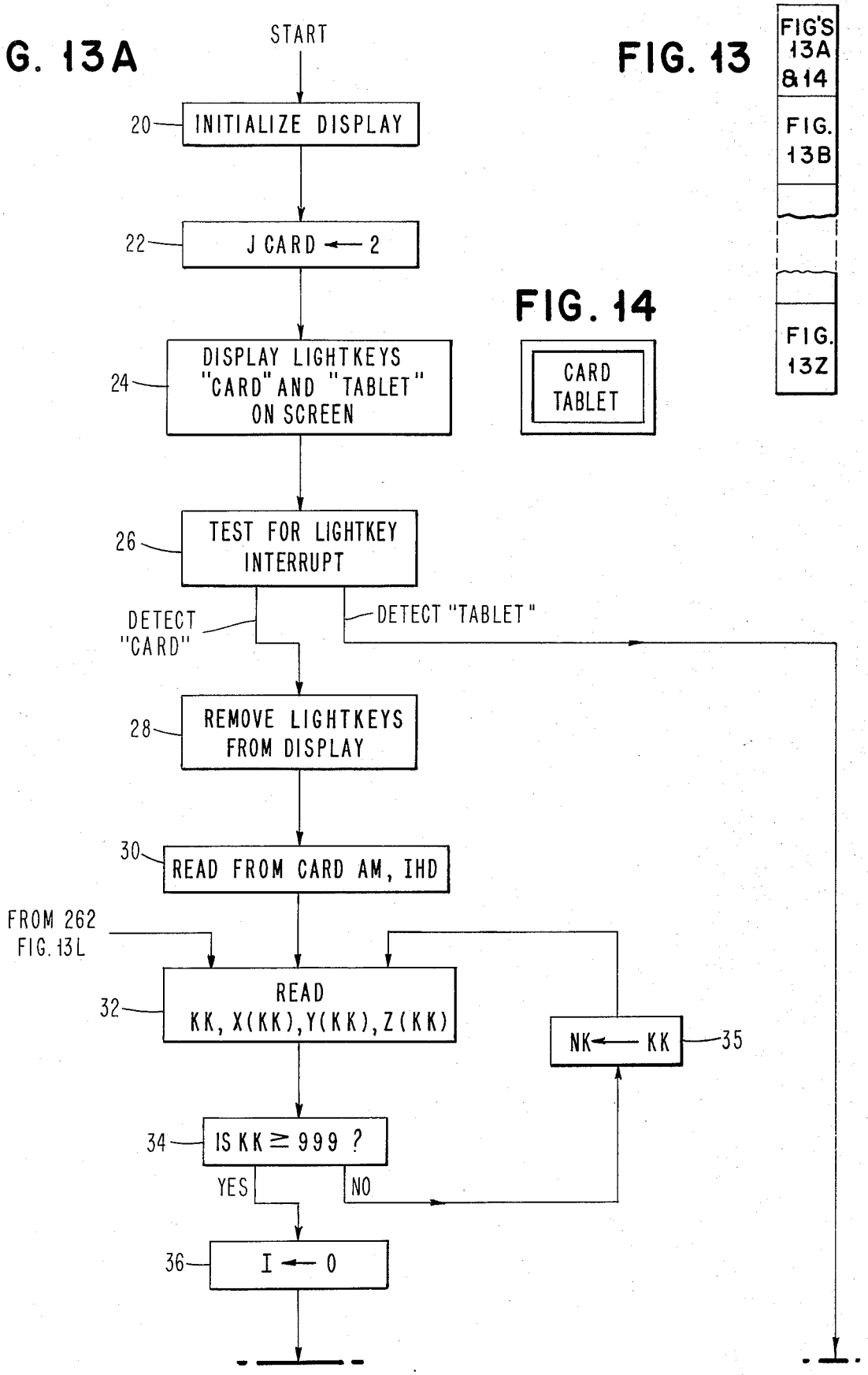
Figure 13B:
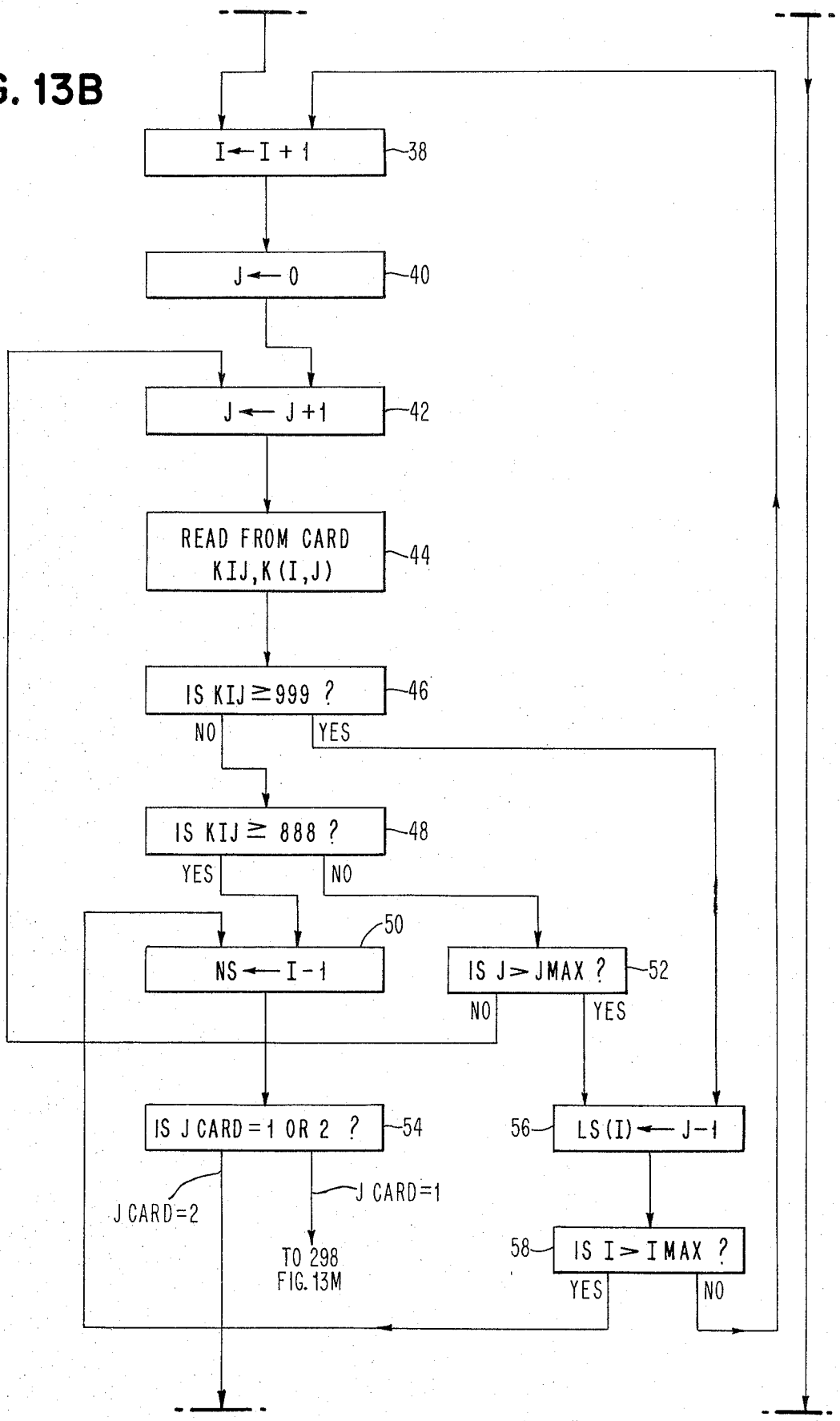
Figure 13C:
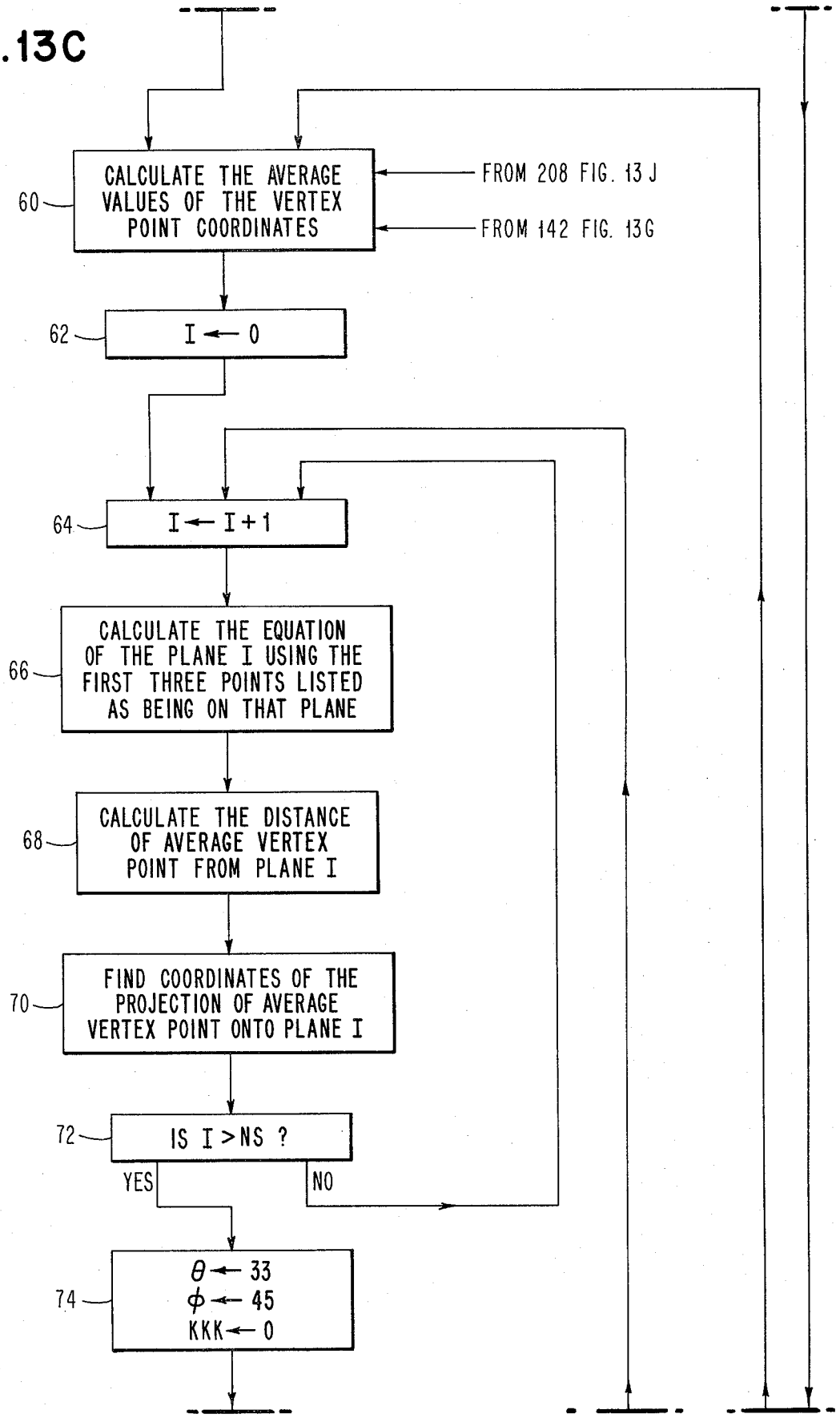
Figure 13D:
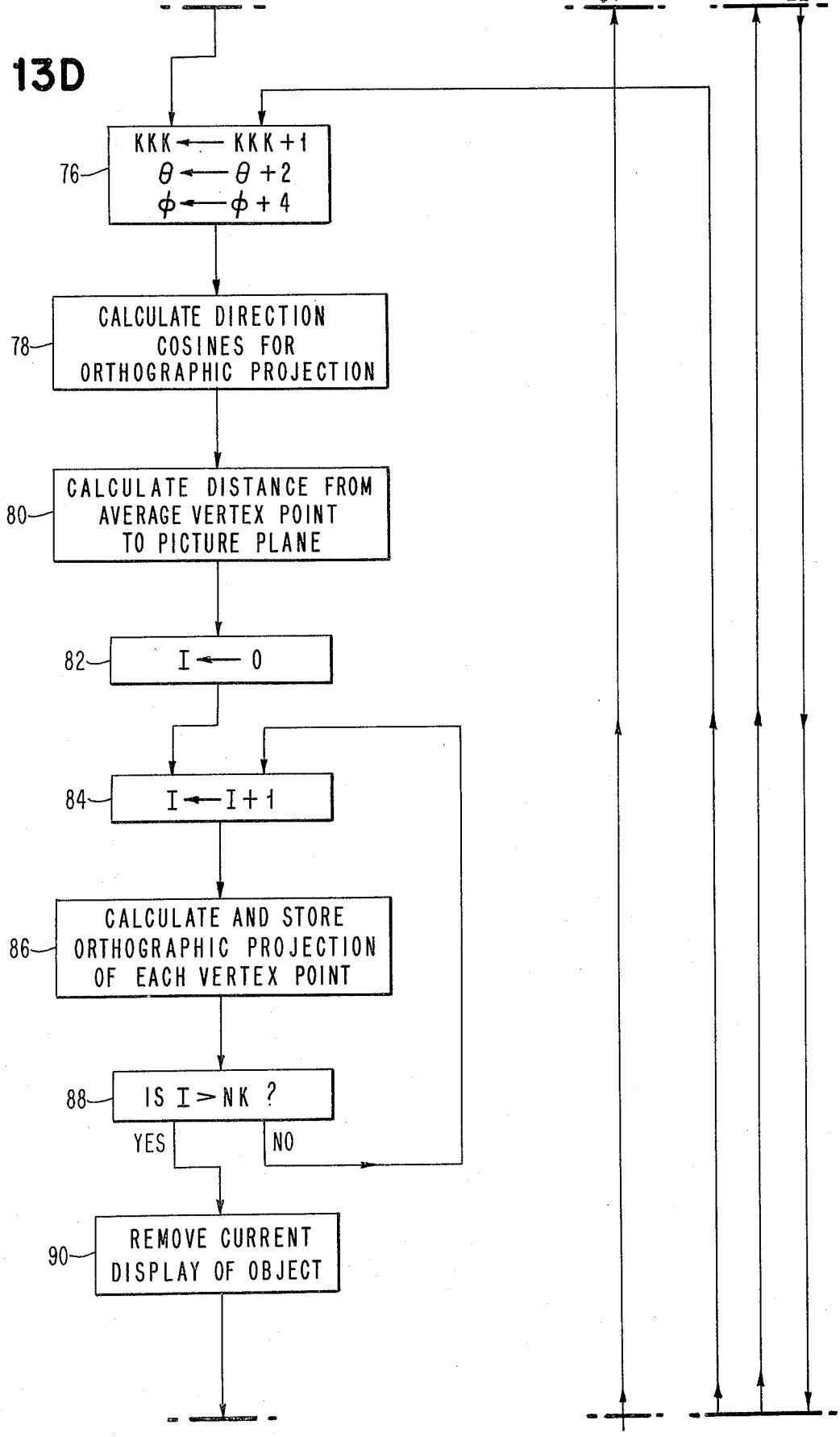
Figure 13E:
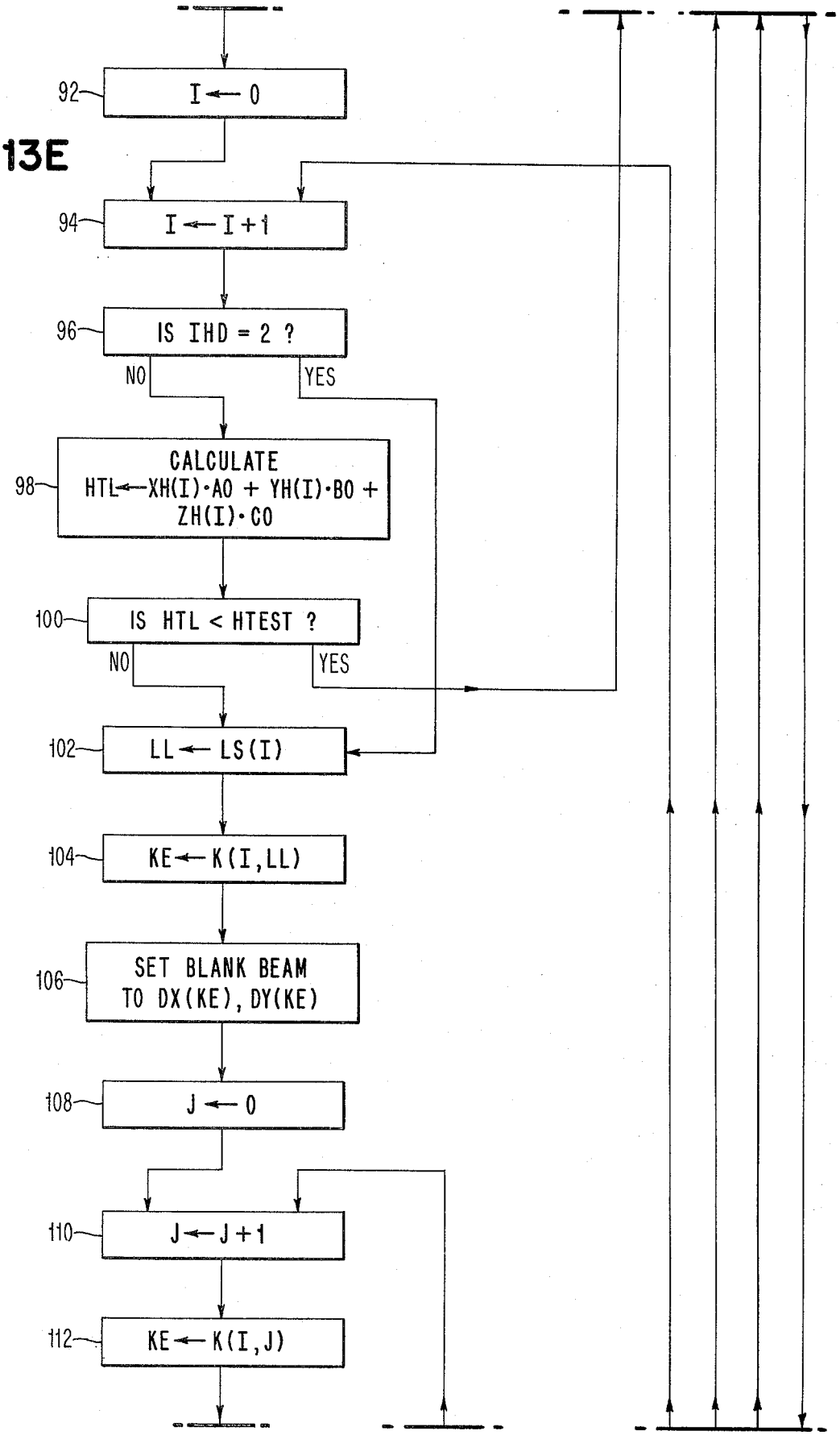
Figure 13F:
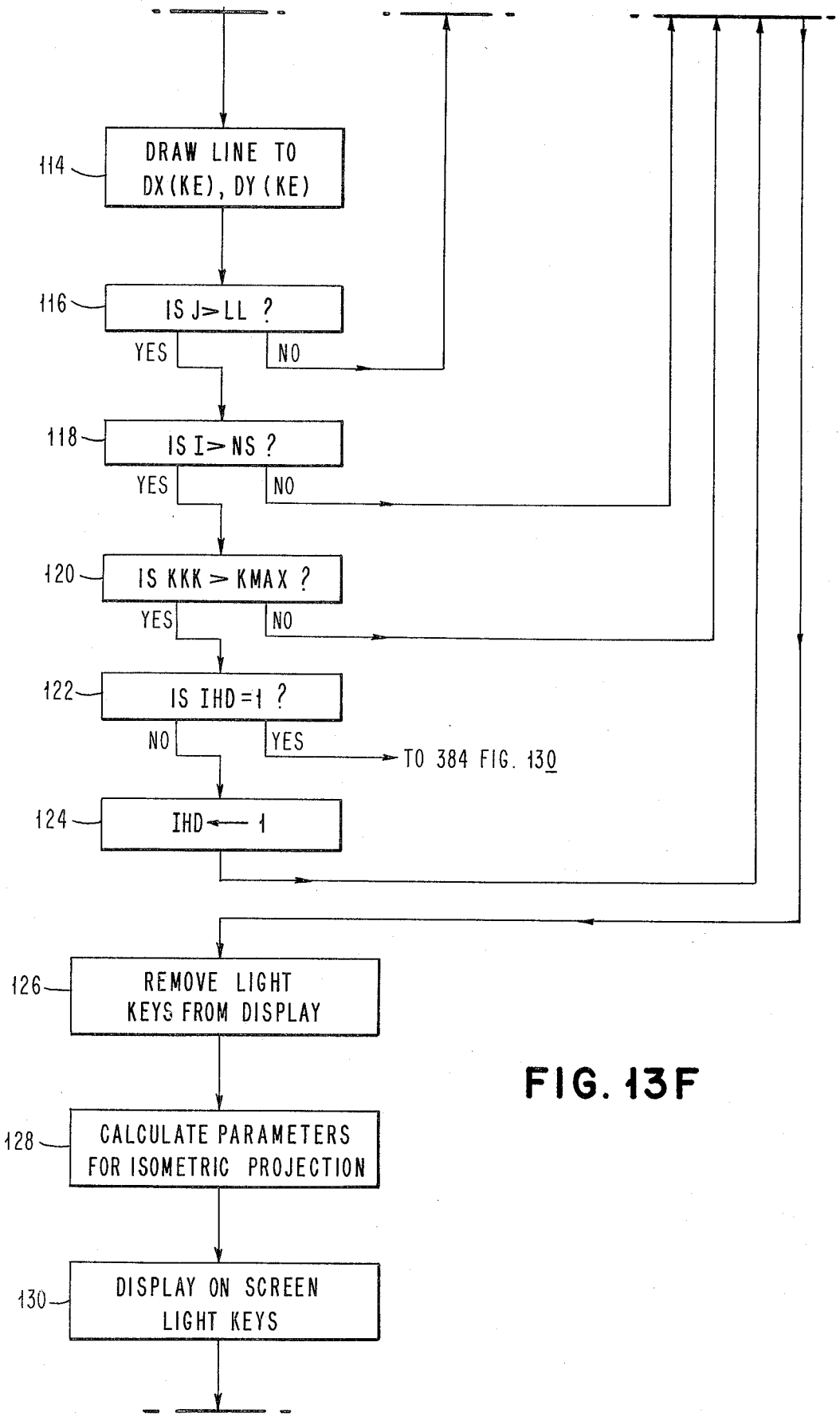
Figure 13G:
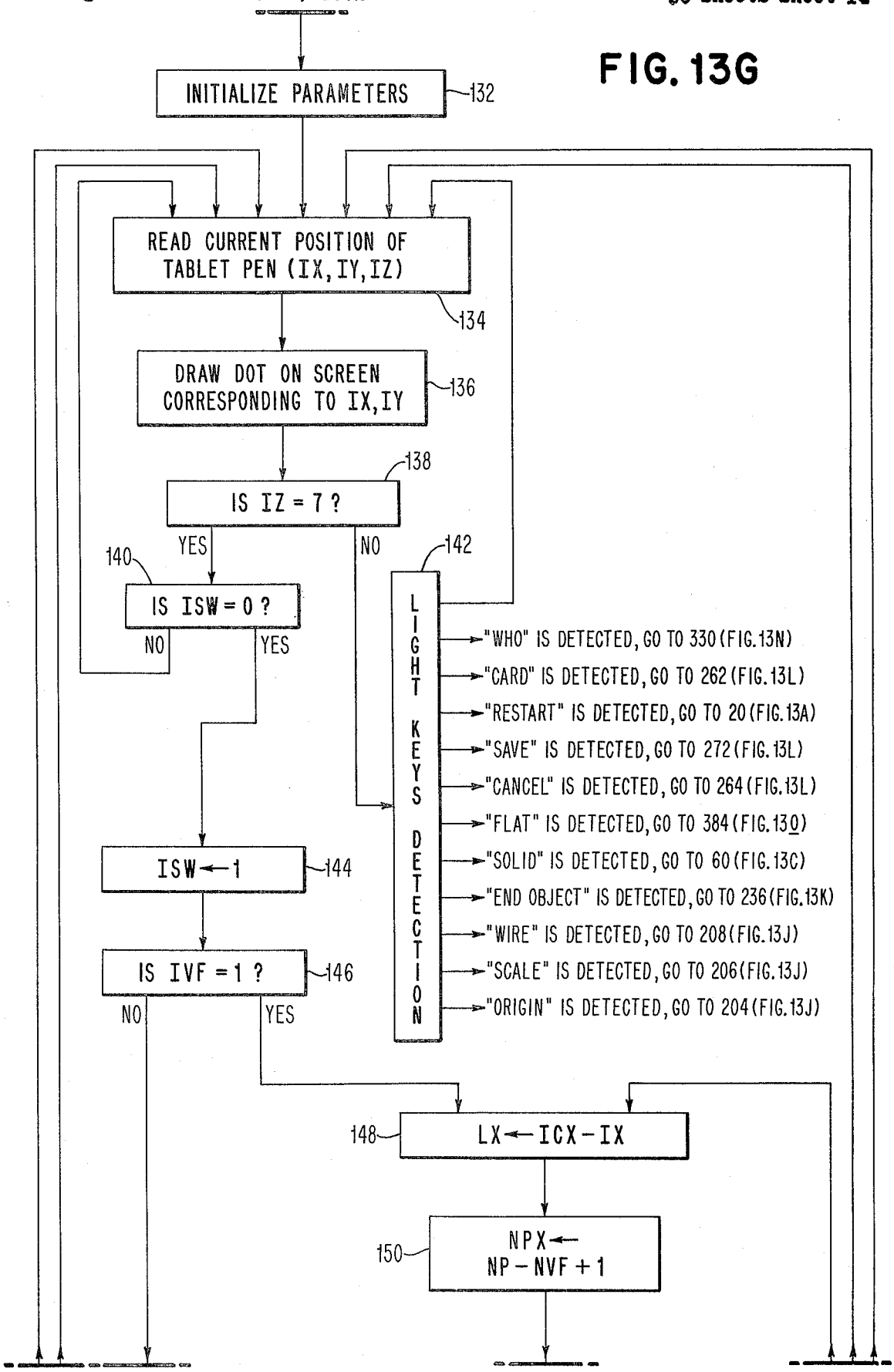
Figure 13H:
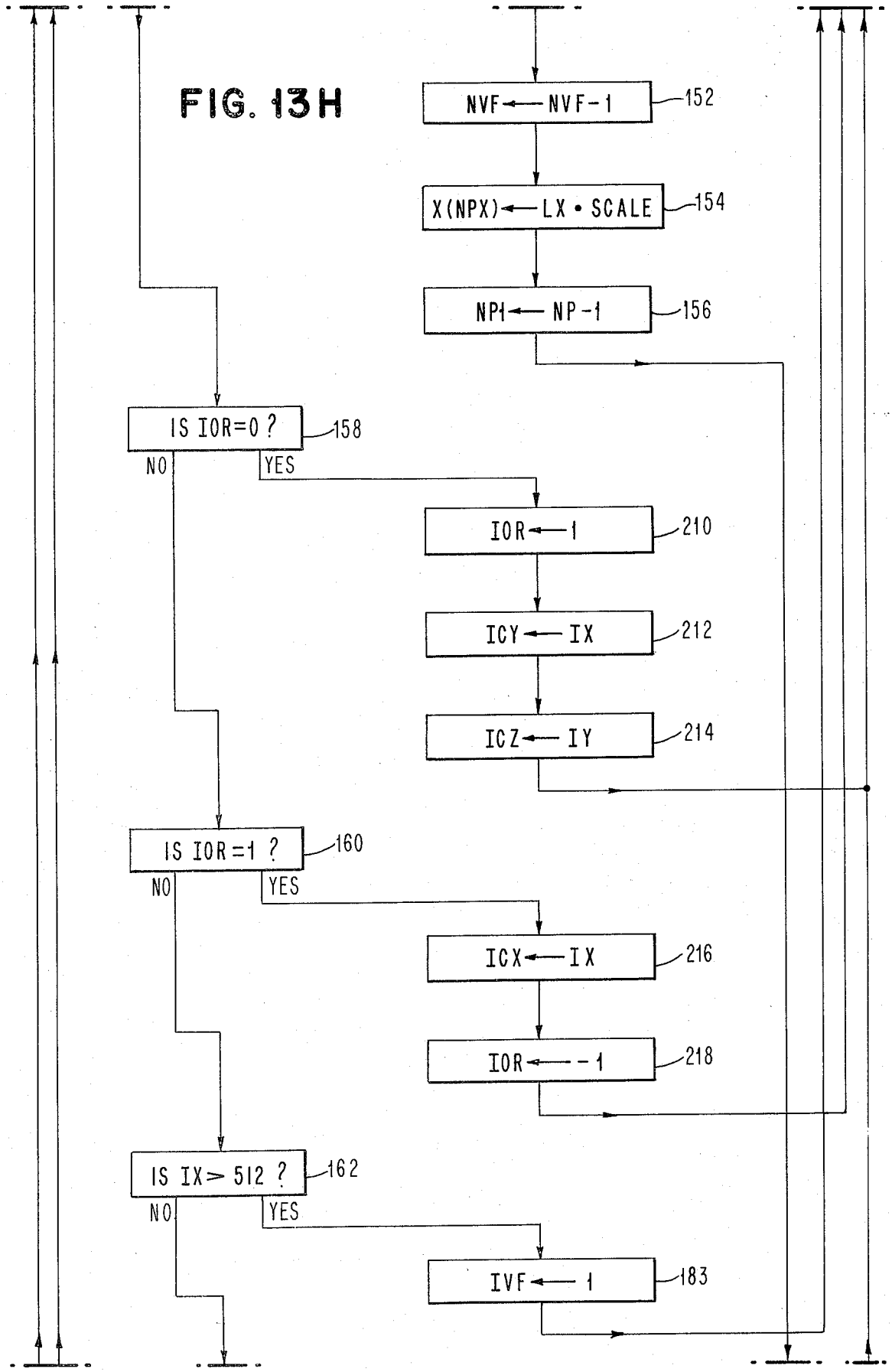
Figure 13I:
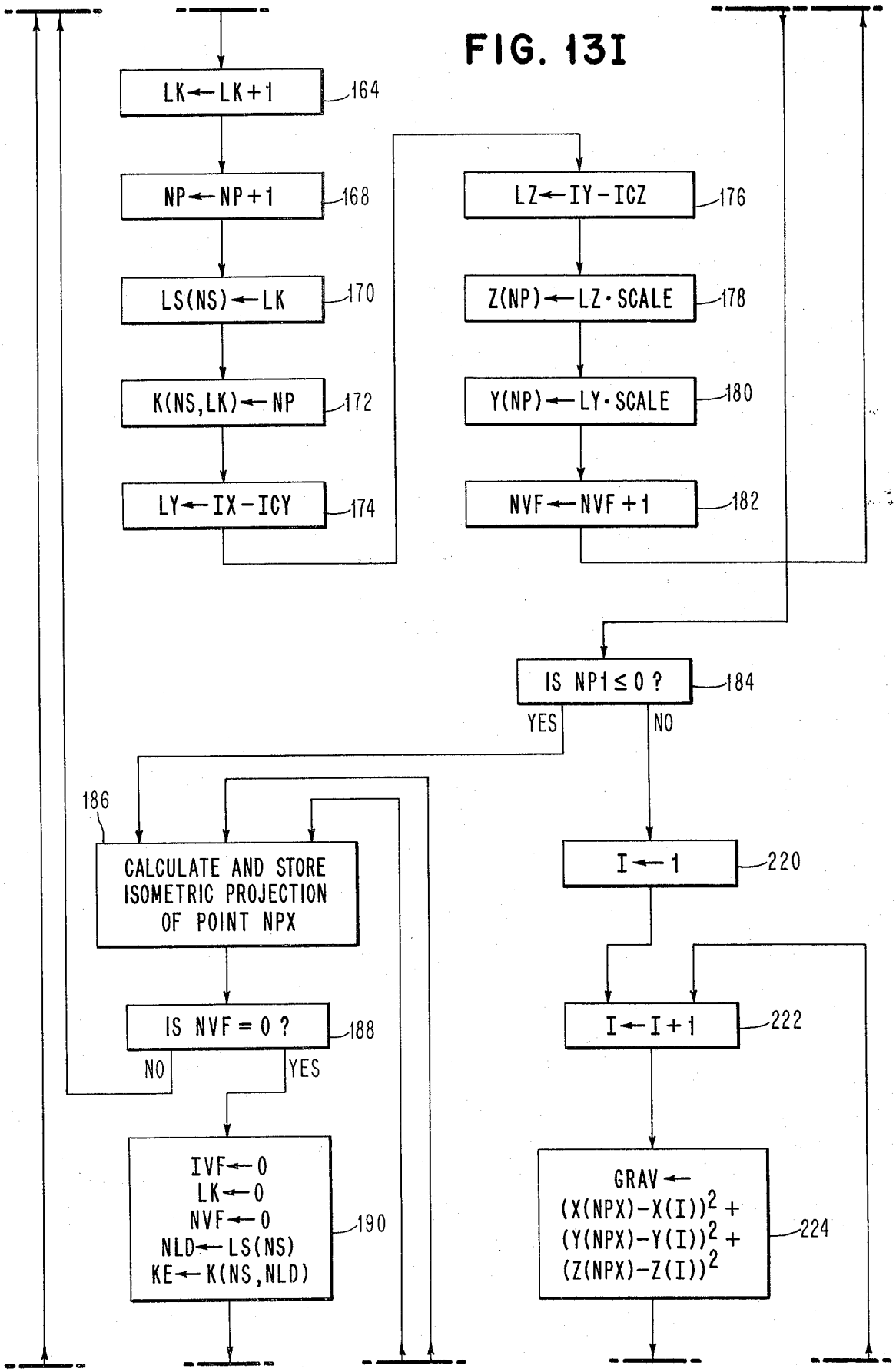
Figure 13J:
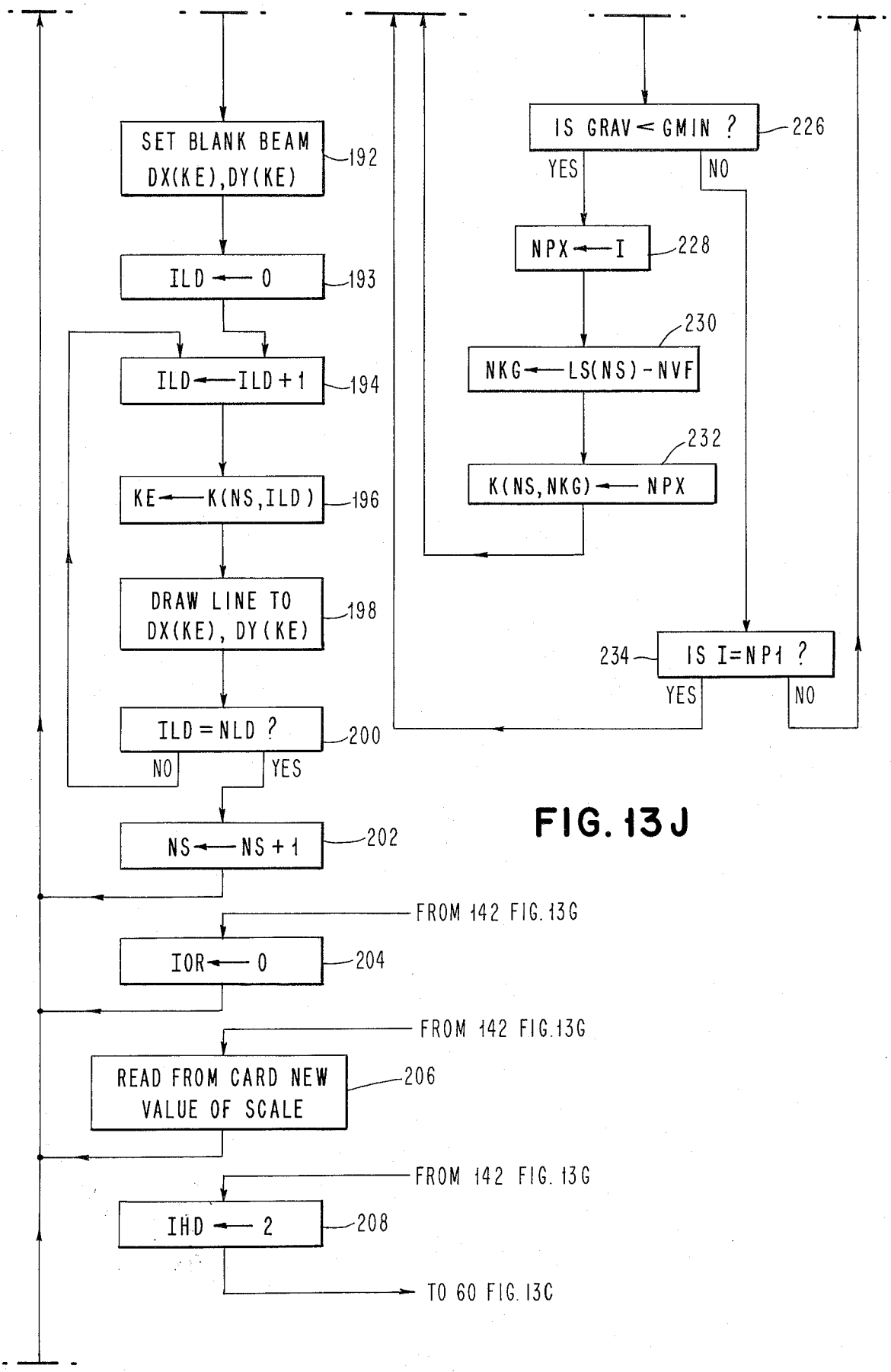
Figure 13K:
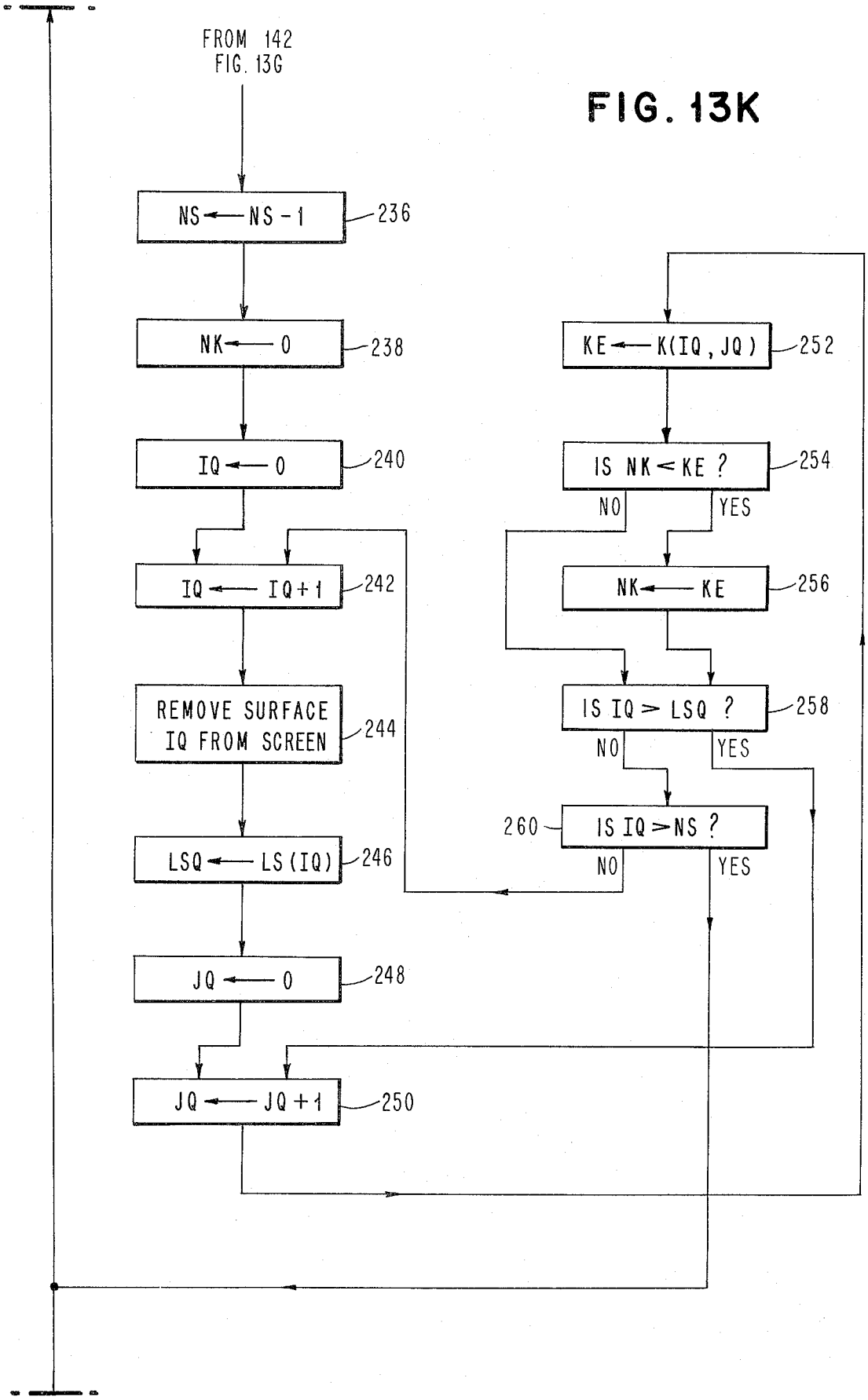
Figure 13L:
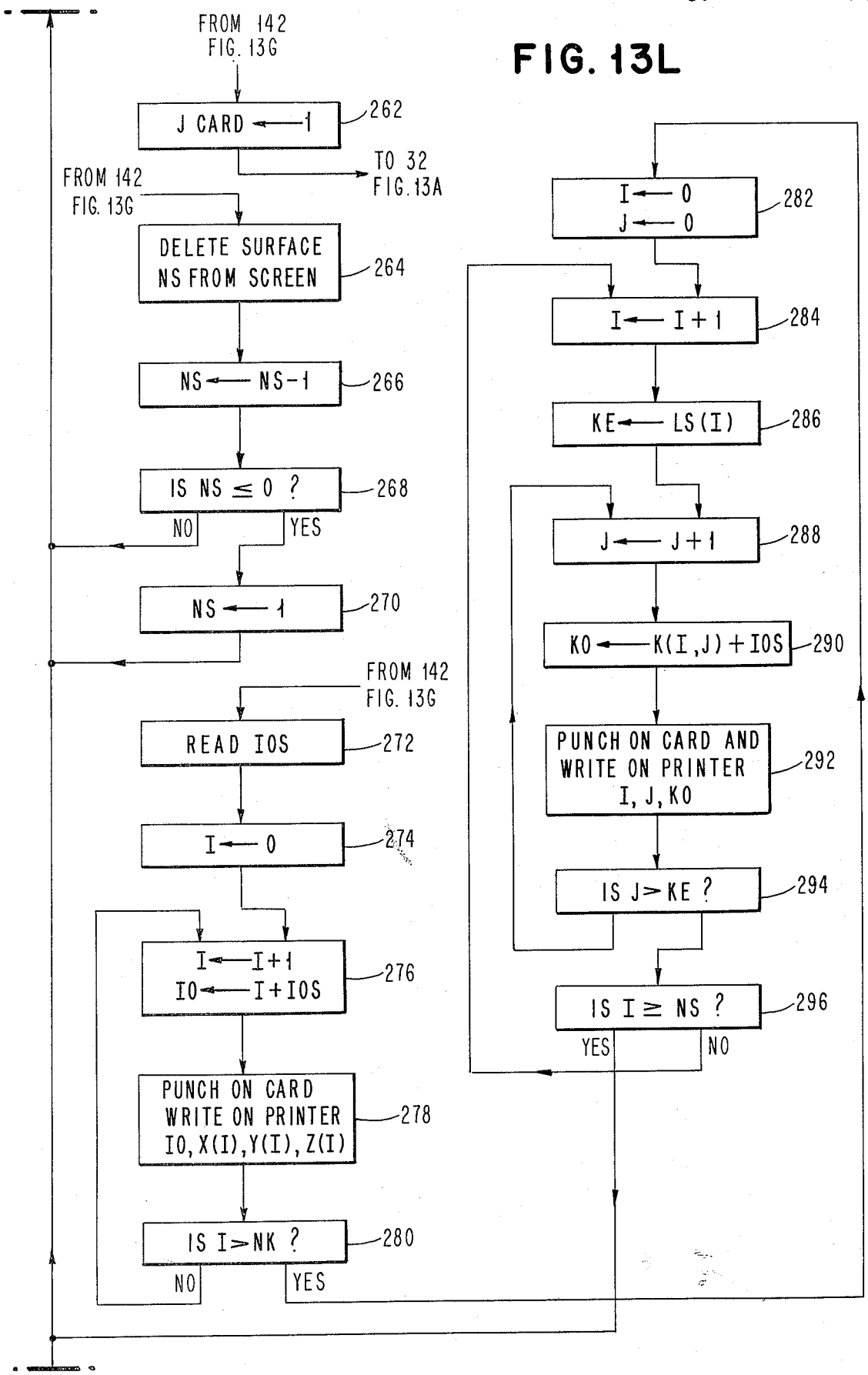
Figure 13M:
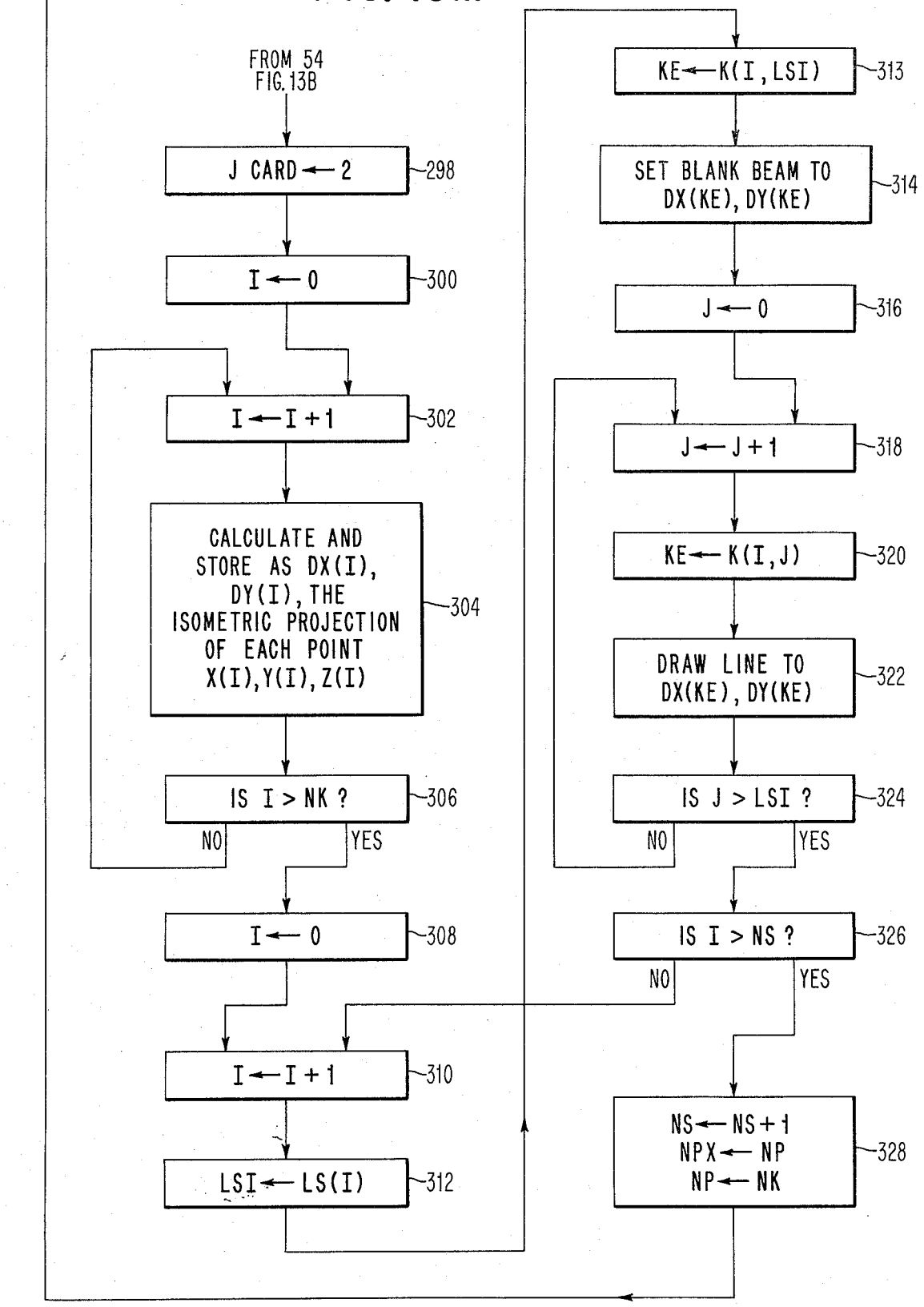
Figure 13N:
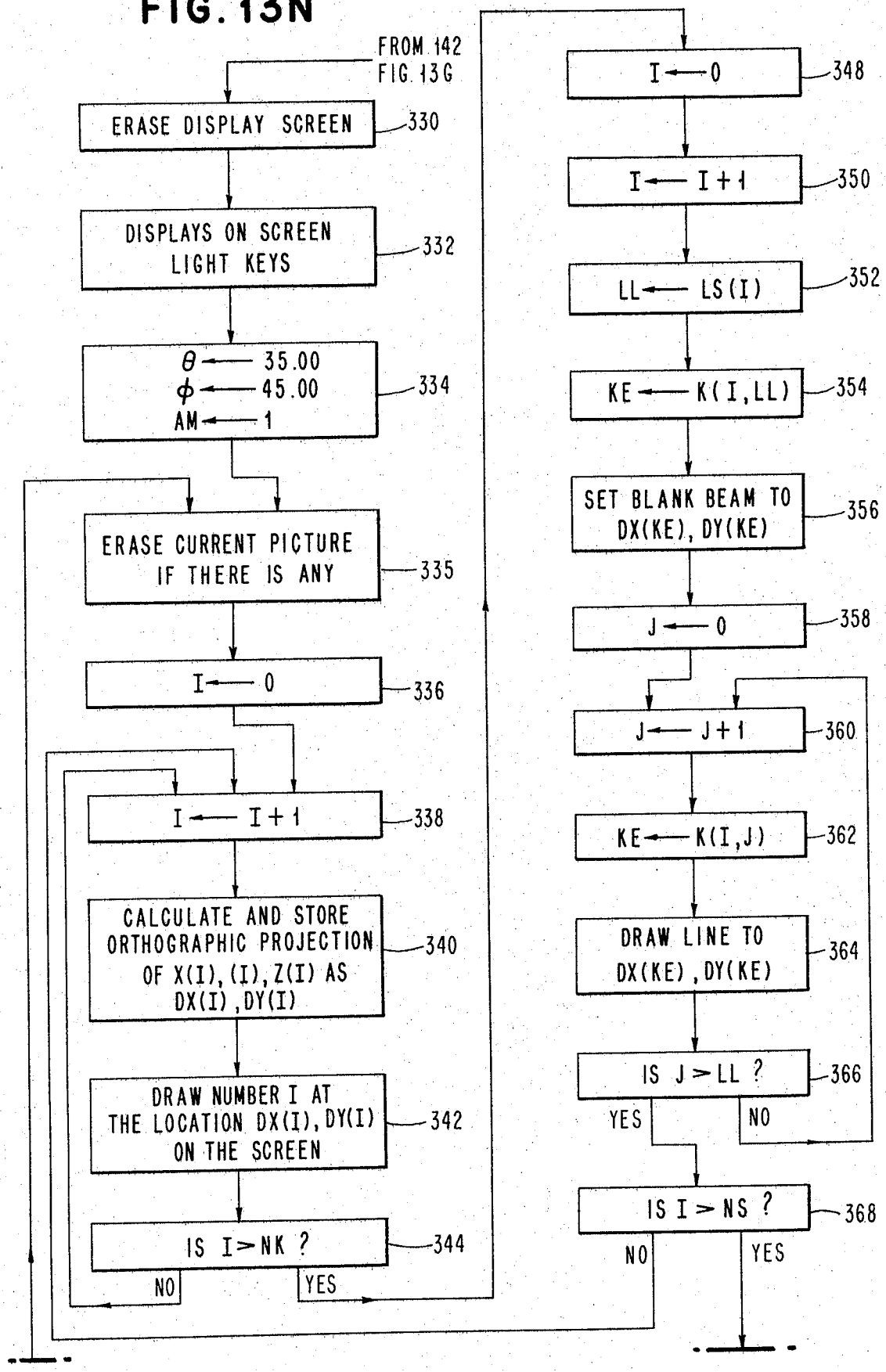
Figure 13O:
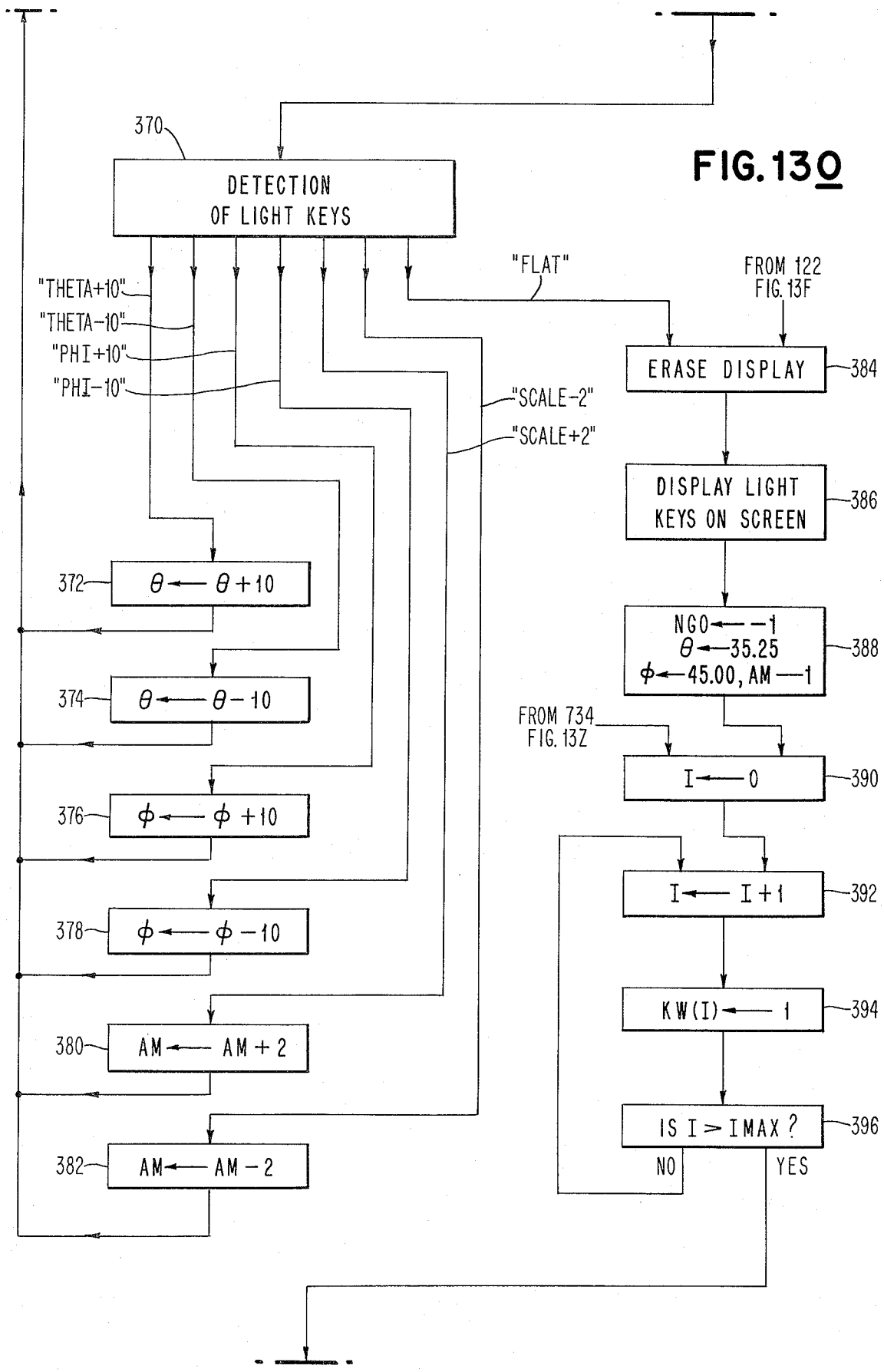
Figure 13P:
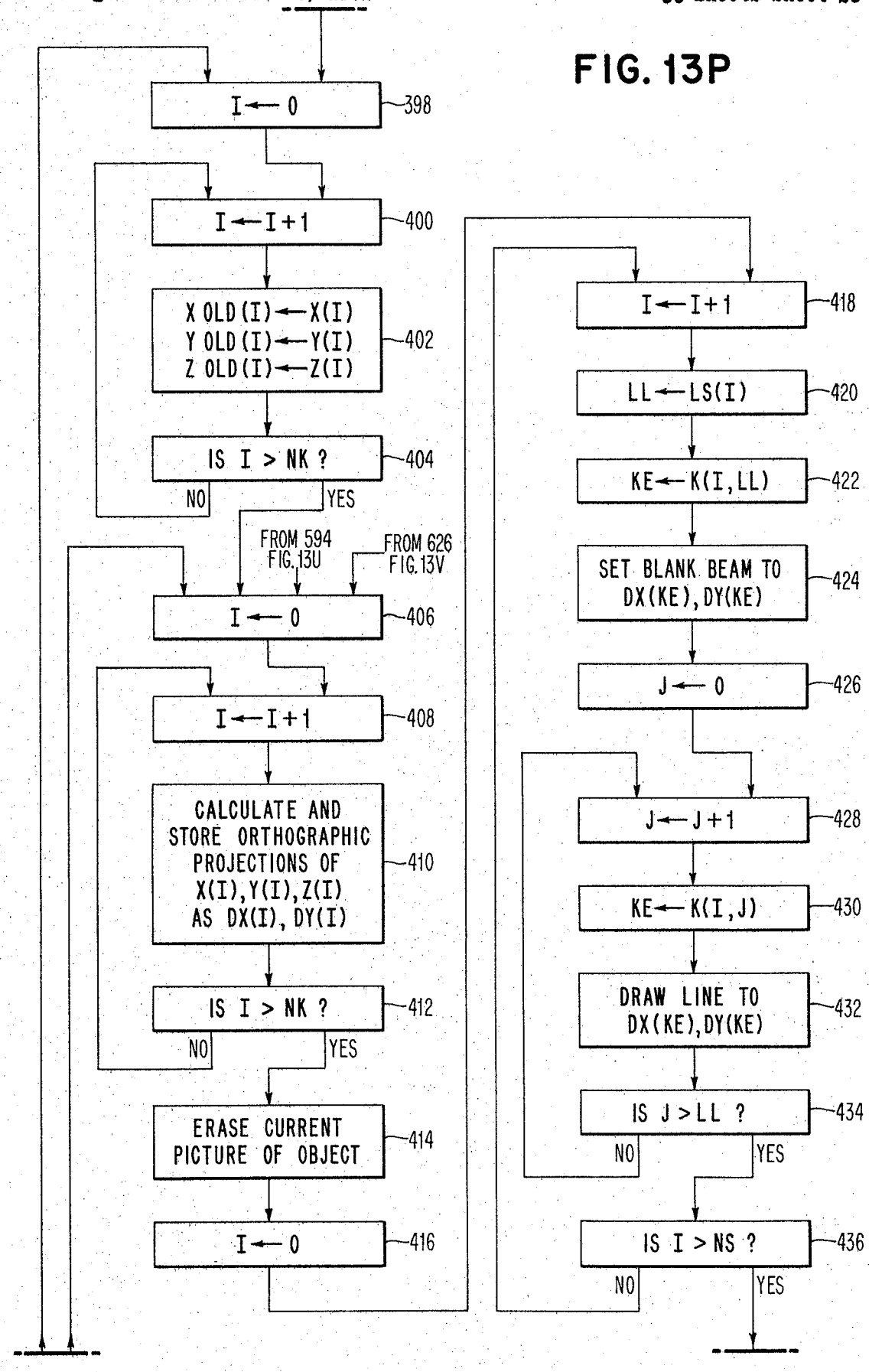
Figure 13Q:
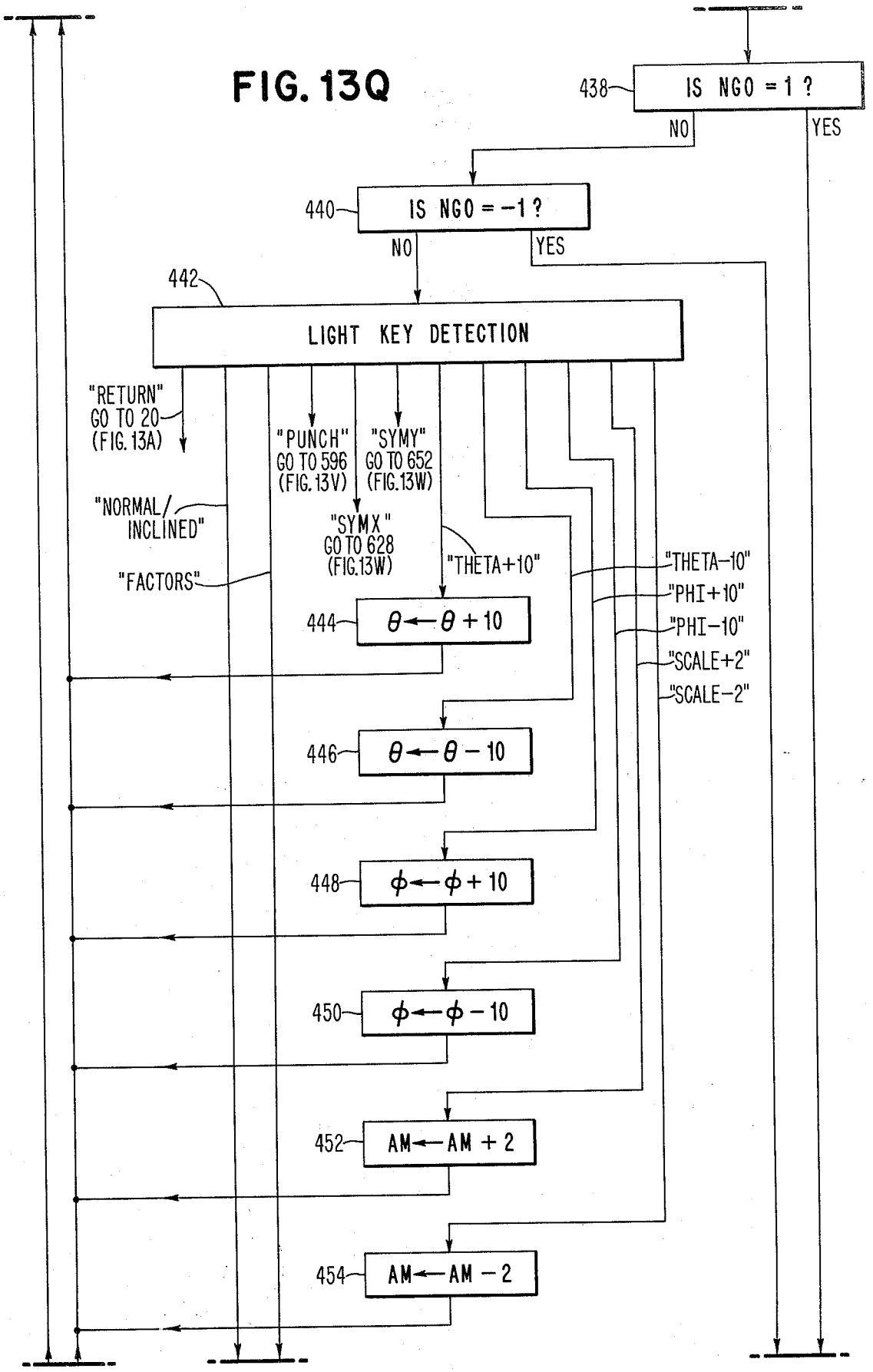
Figure 13R:
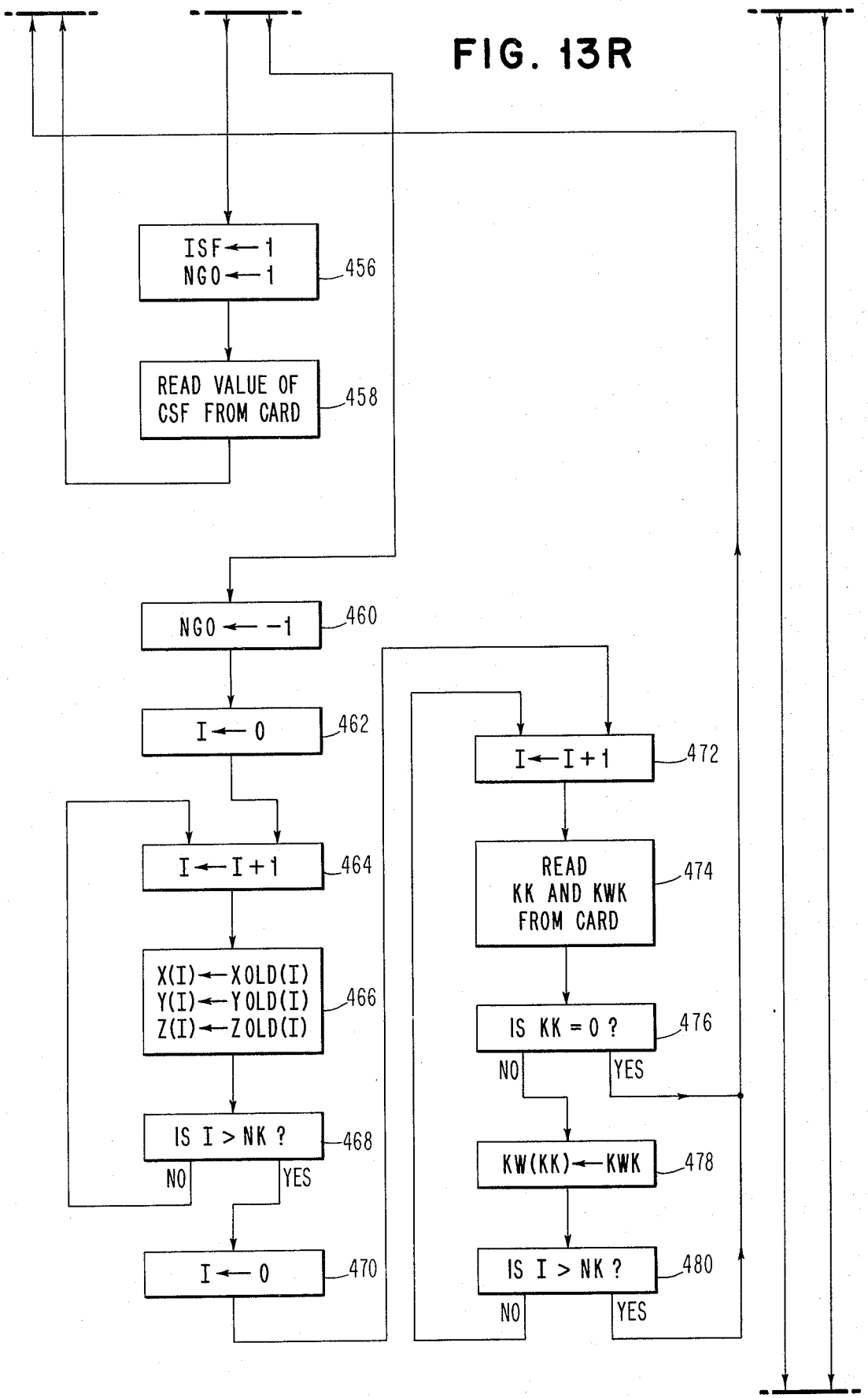
Figure 13S:
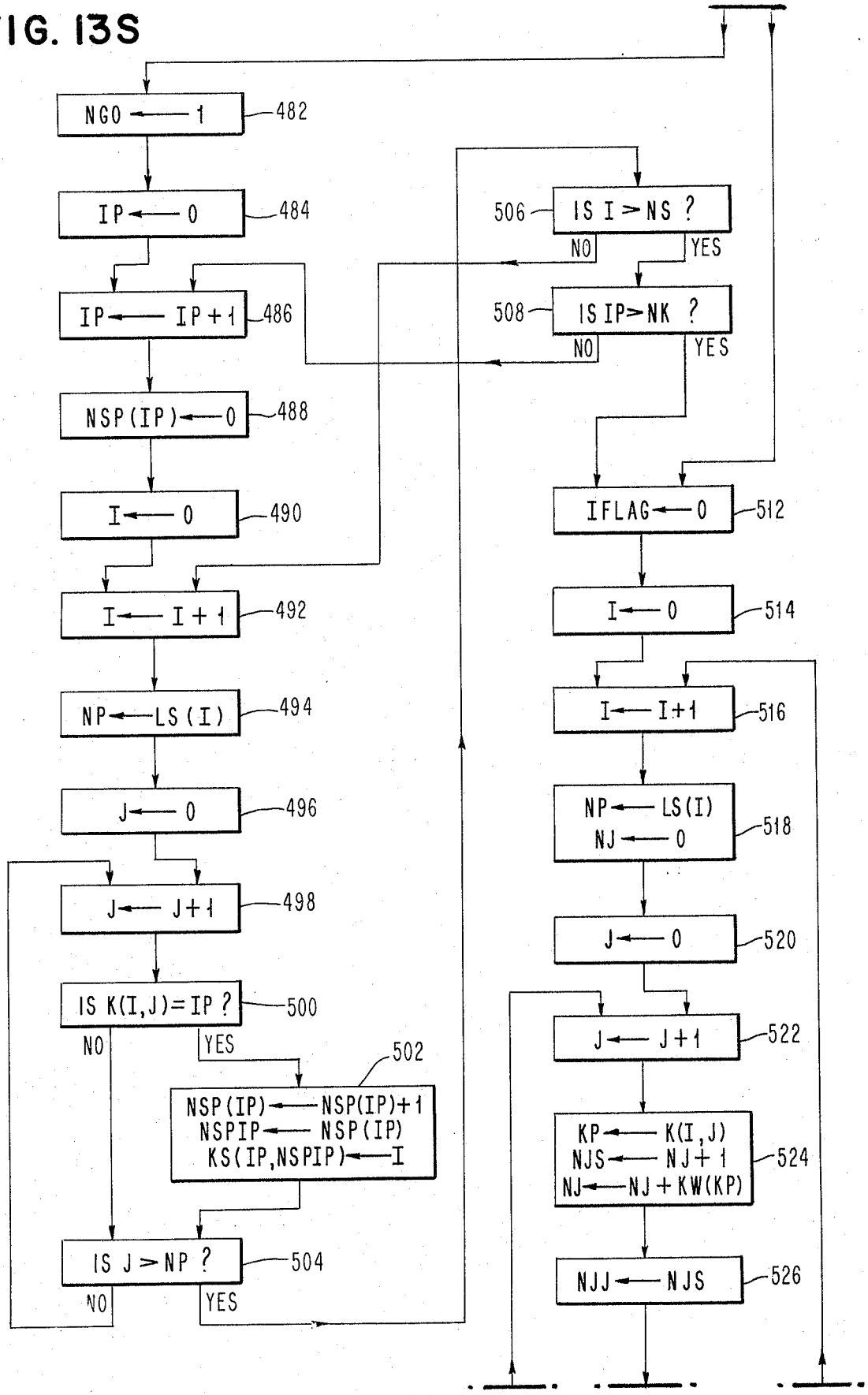
Figure 13T:
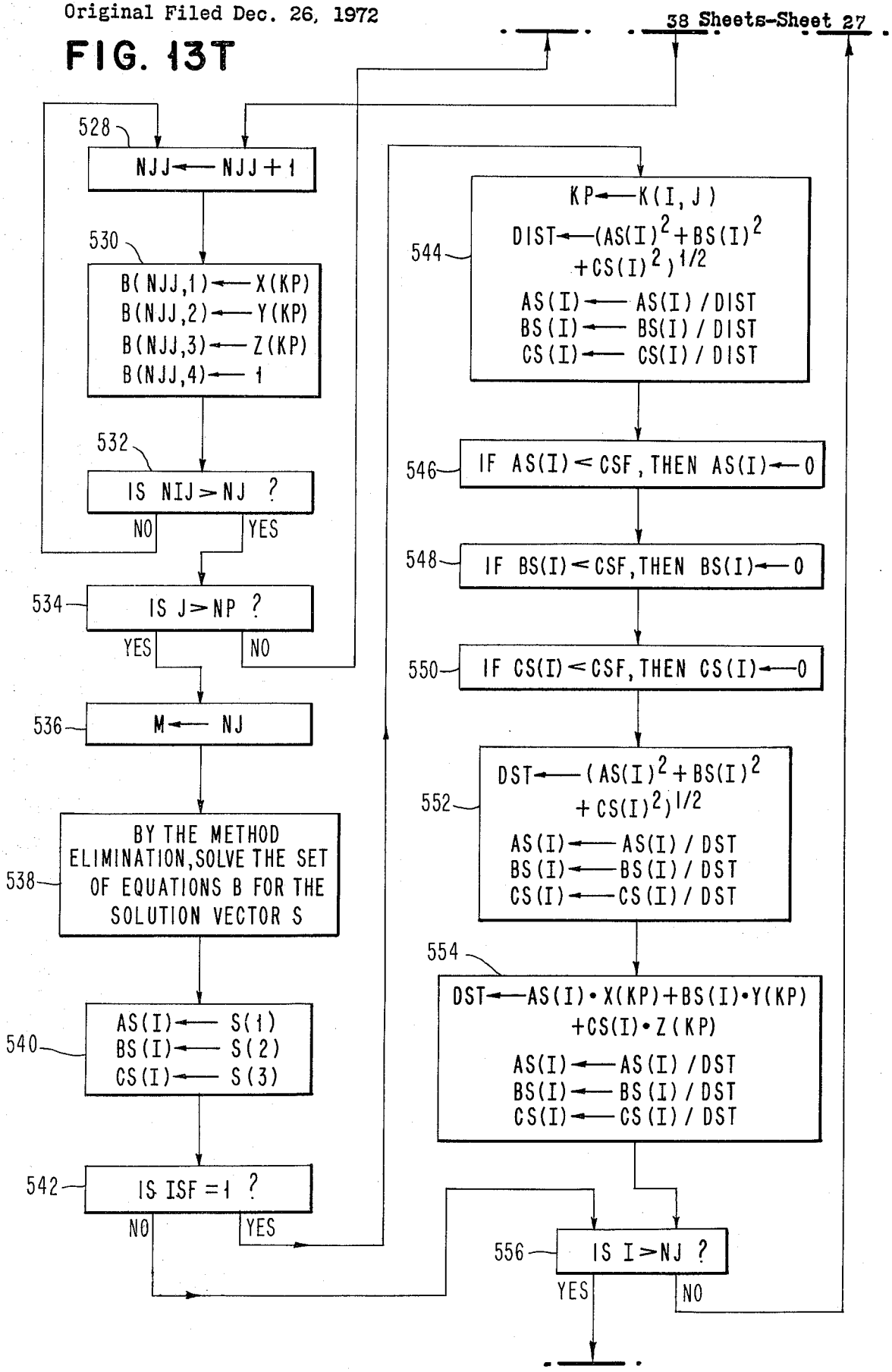
Figure 13U:
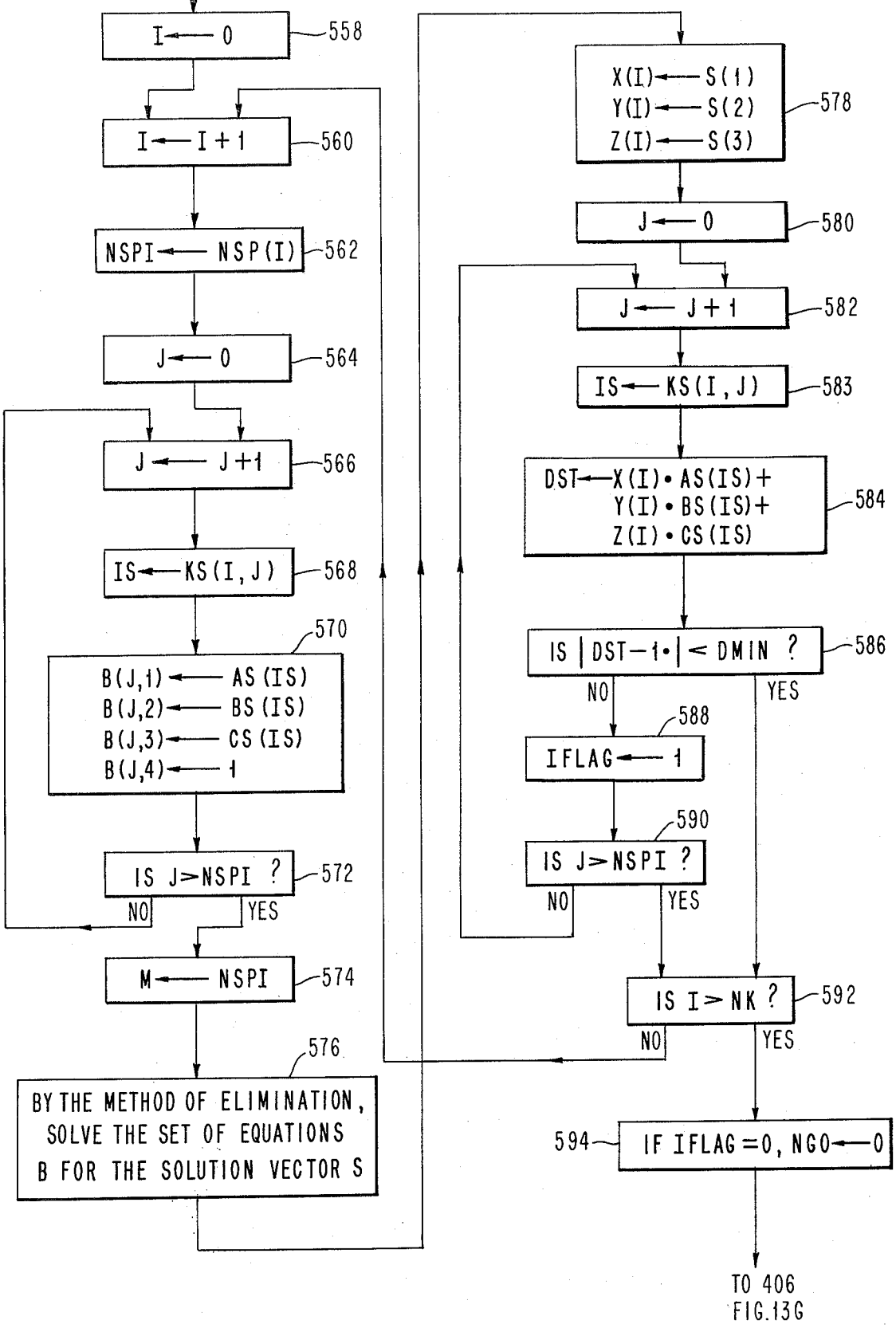
Figures 13P, 13Q, 13V:
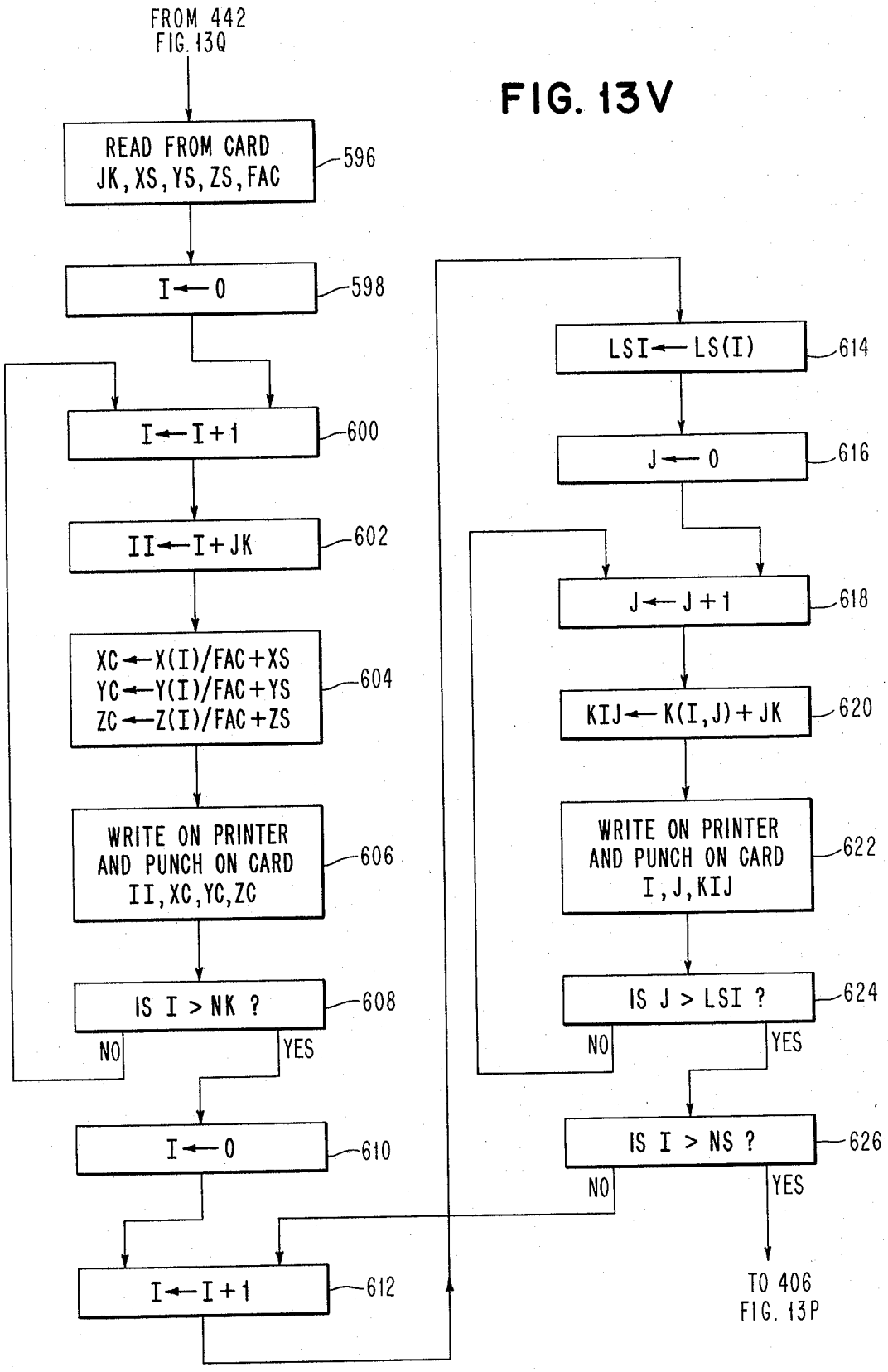
Figure 13W:
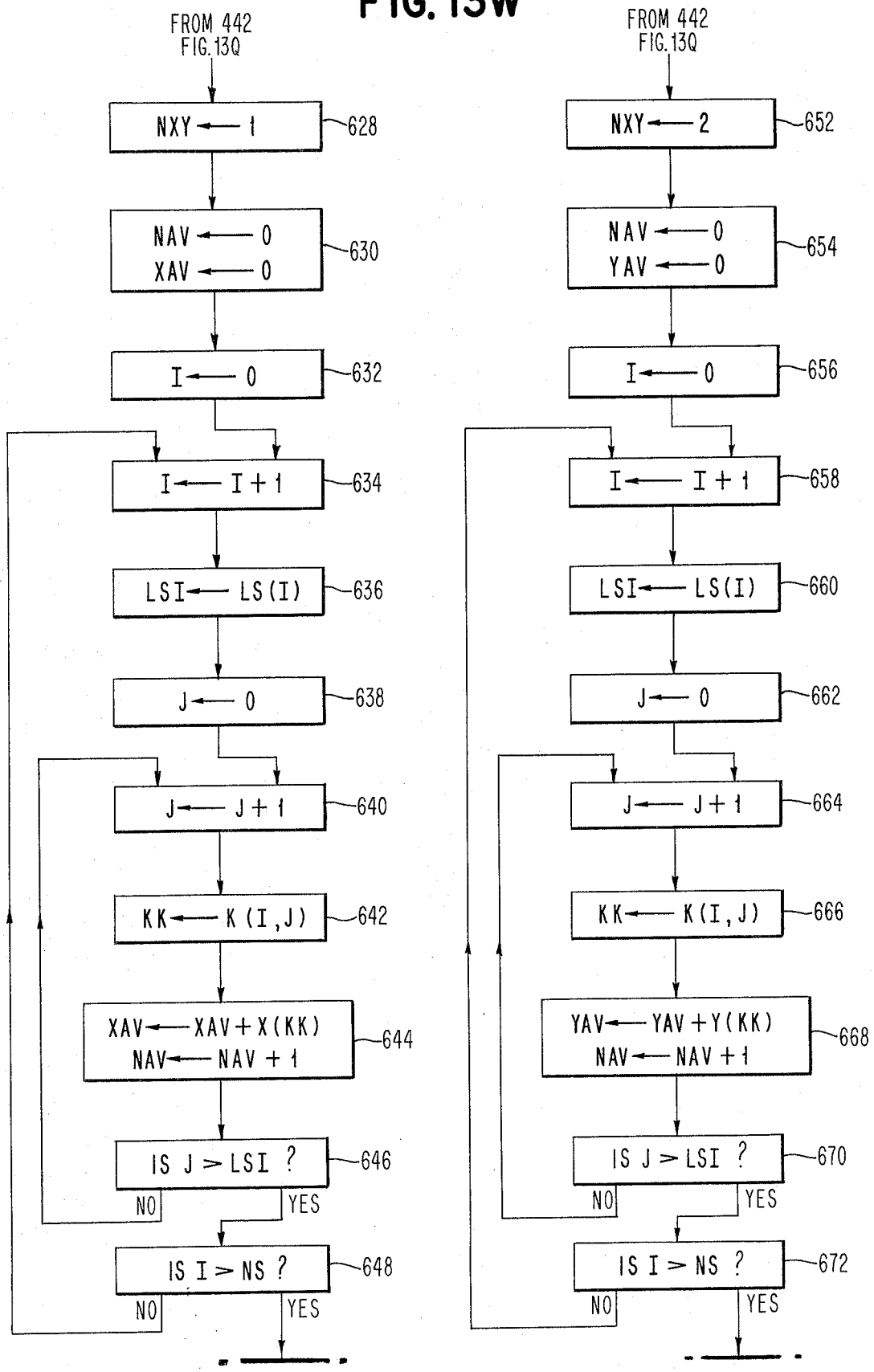
Figure 13X:
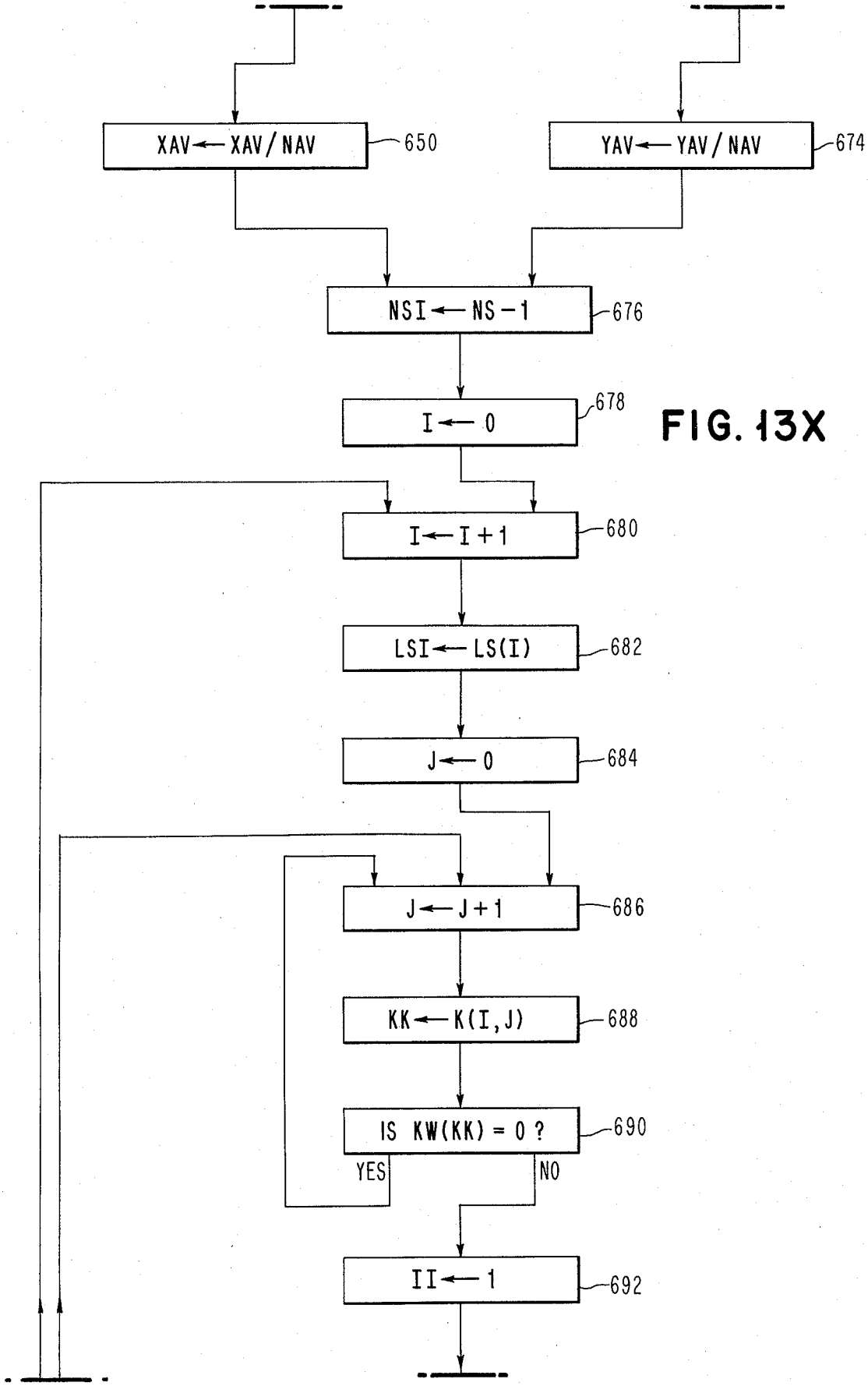
Figure 13Y:
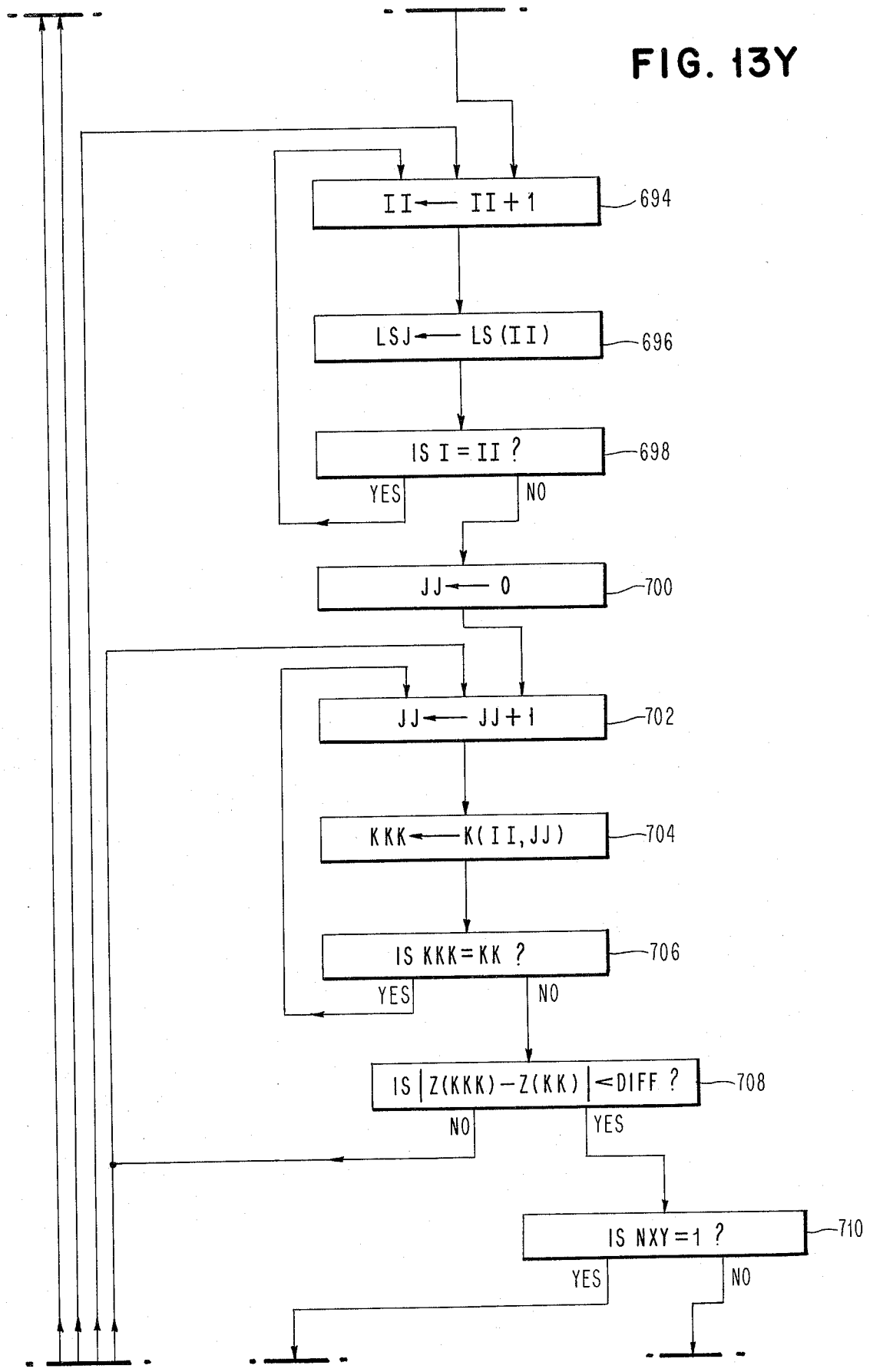
Figure 13Z:
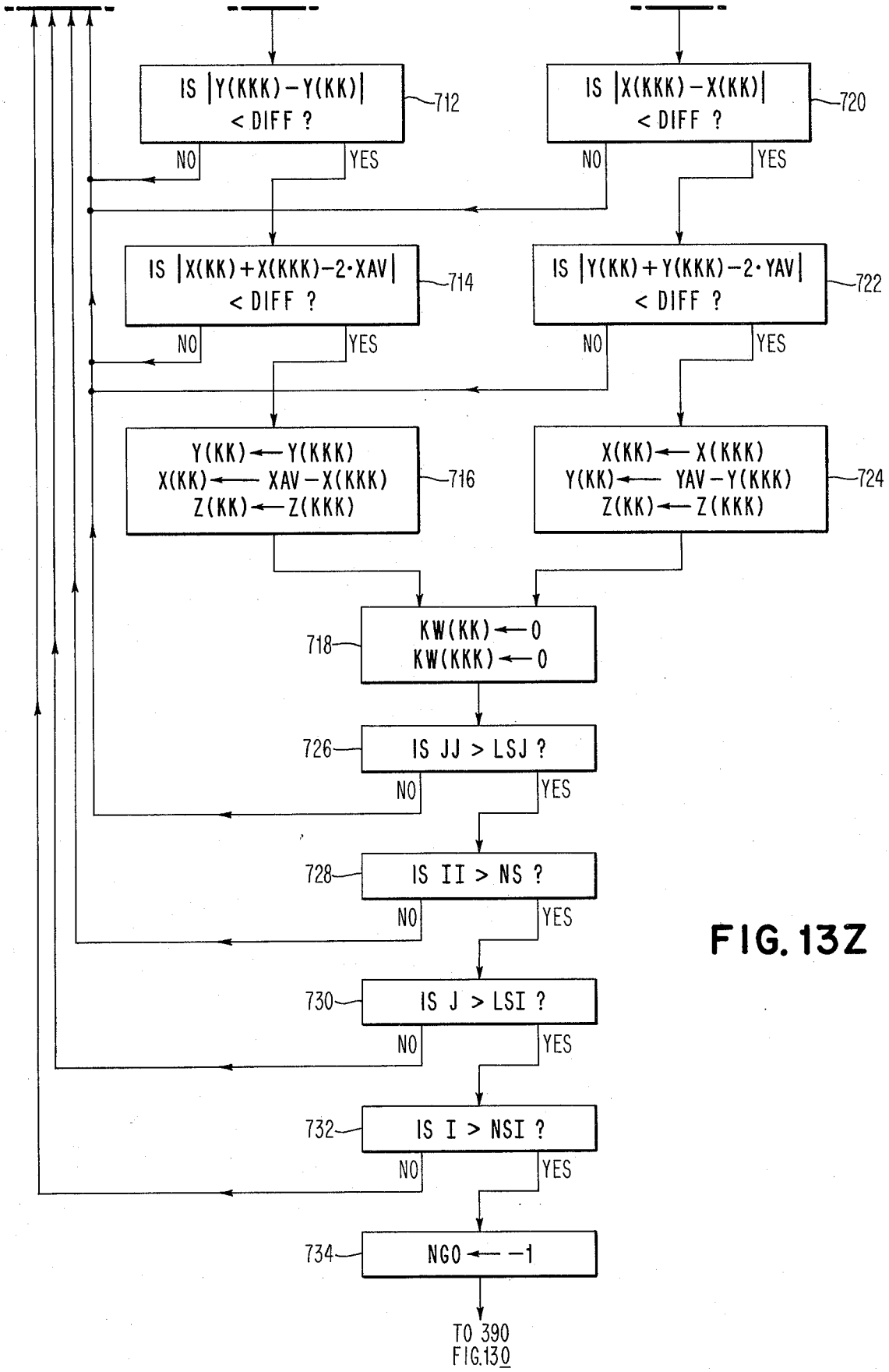
Figure 17:
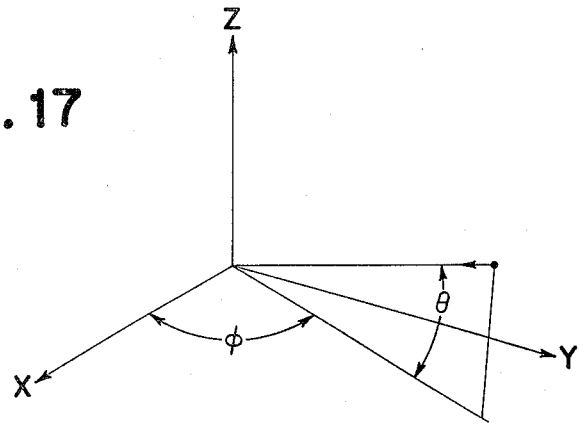
Figure 18:
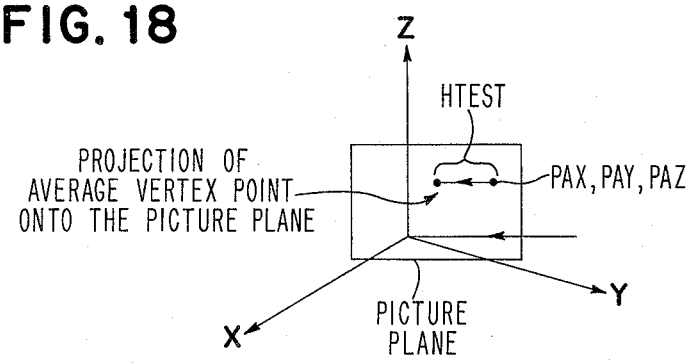
Figure 19:
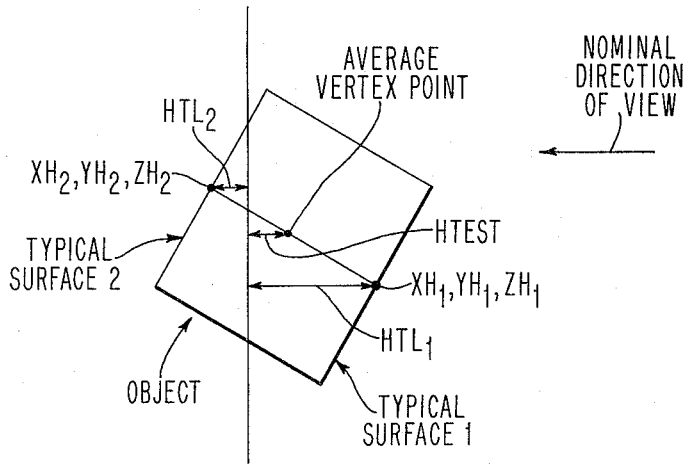
Figure 20:
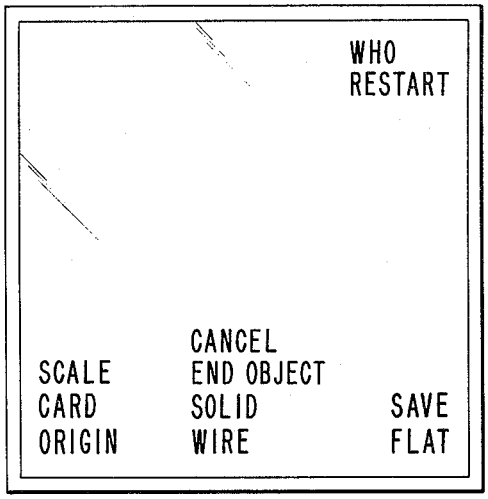
Figure 21:
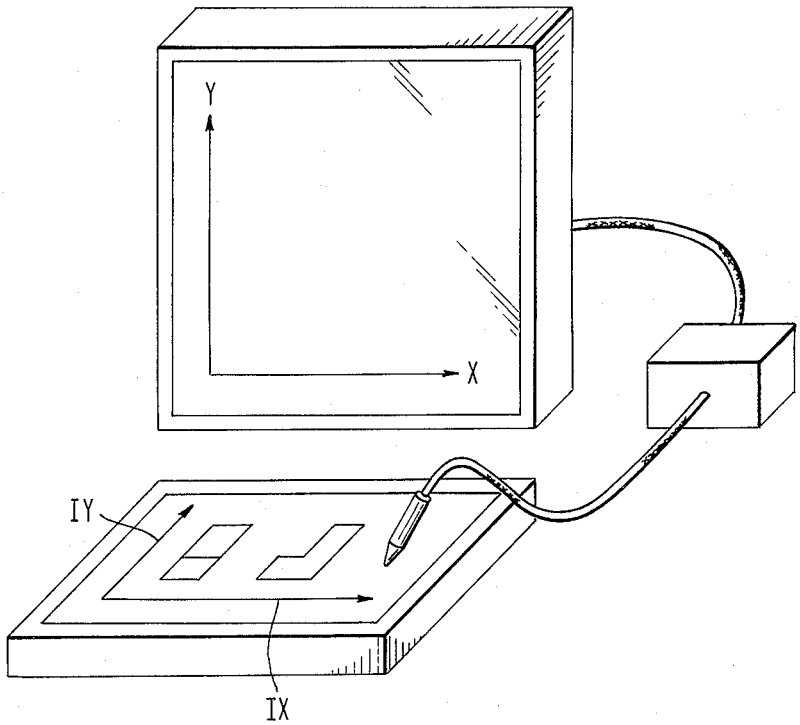
Figure 22:
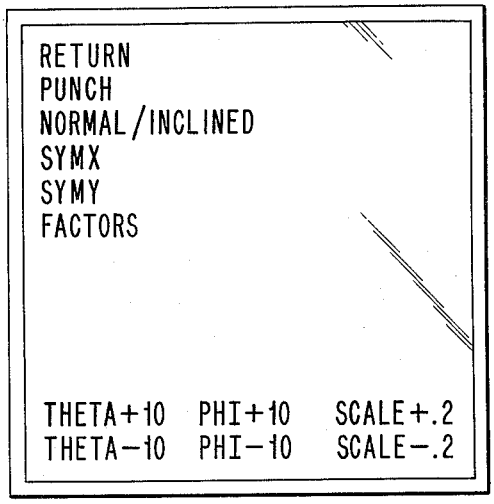
Figure 23:
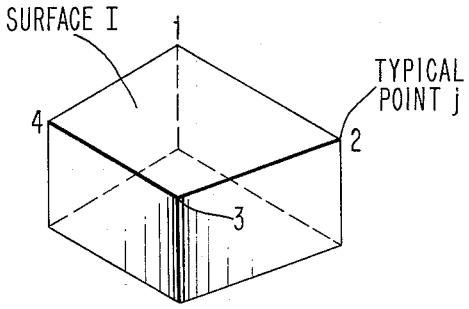
Figure 24:
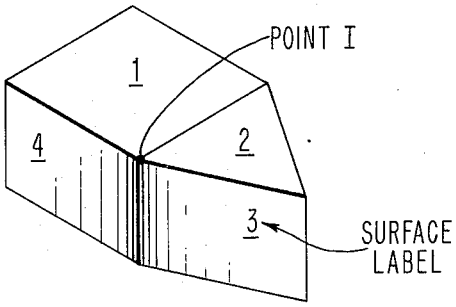
Figures 25, 25A, 25B:
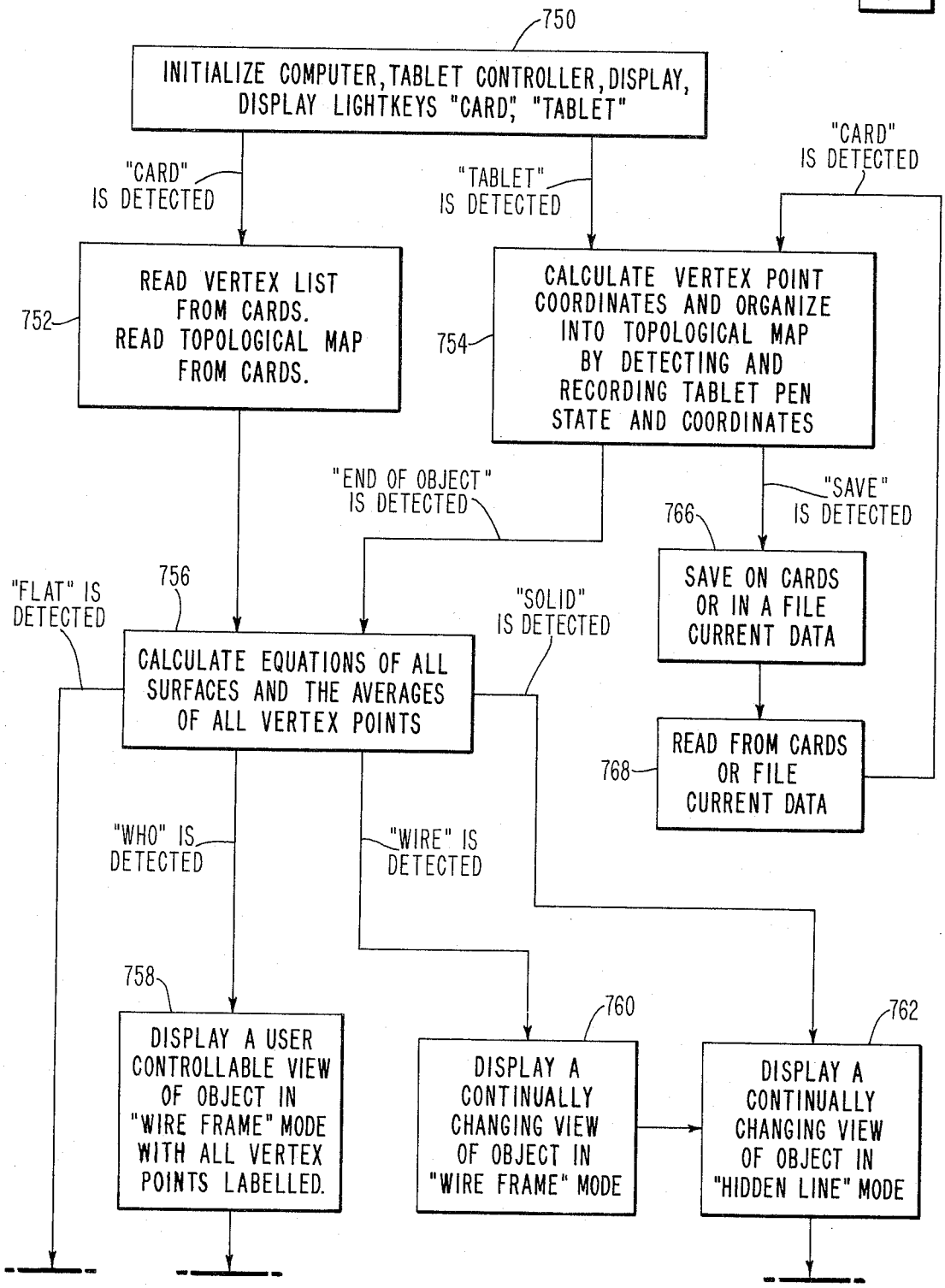
Figure 25B:
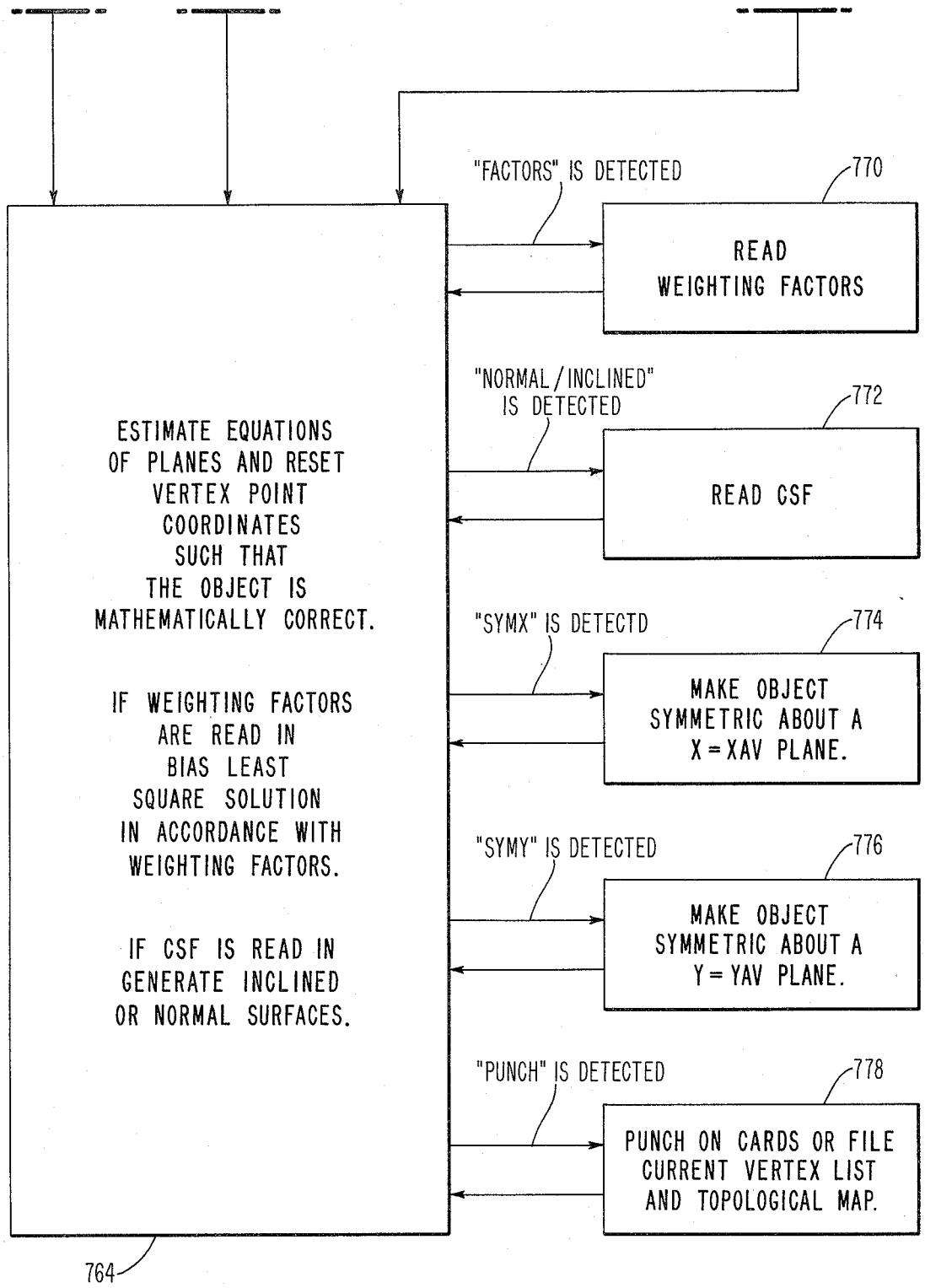

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 3, 1975

935 O.G. 10

T935,004

PROCESS FOR THE INTERACTIVE DESIGN OF POLYHEDRA

Arthur Appel, 1512 Indiana Ave., Yorktown Heights, N.Y. 10598, Arthur J. Stein, 35 Wheeler Drive, Peekskill, N.Y. 10566

Continuation of abandoned application Ser. No. 318,452, Dec. 26, 1972. This application May 17, 1974, Ser. No. 471,090

Int. Cl. G06f *15/20*

U.S. Cl. 444—1

38 Sheets Drawing. 82 Pages Specification

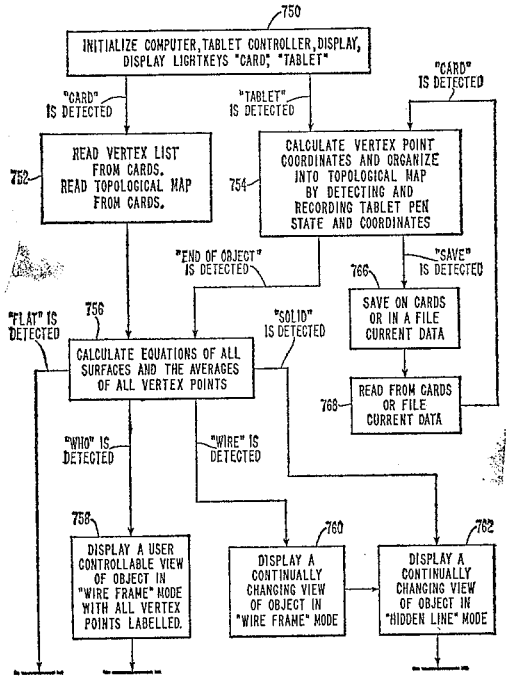

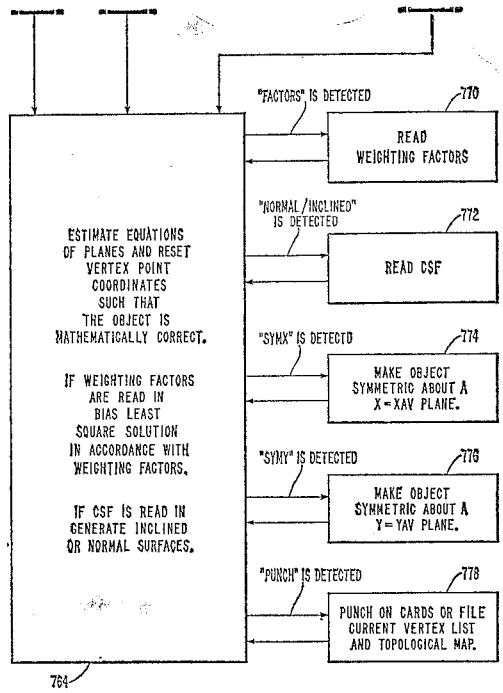

In the process described herein, there is sketched on the screen of an interactive graphics display device a front view and a side view of a three-dimensional object such as a polyhedron, a capacitance tablet being a suitable input sketching device. Thereafter, there is described in the front view of the device, a particular surface boundary. The tracking spot on the screen is placed over successive vertex points in the front view and the interactive graphics device lightpen switch is closed at every vertex point. Thereby, there is recorded from the tracking spot position, the Y and Z coordinates of the vertex point in the order in which these points are entered. Next, the same surface is described in the right side view by selecting the vertex points in the same order. A computer determines the X coordinate in this view and since the order of entering data is the same in both views, X values can be assigned to the correct vertex point. The order in which points are entered is the topological map for the surface and the coordinates of all vertex points are known. If the tracking spot is detected in the right-half of the screen, encoded points are treated as being in the right side view. When the number of points entered for a particular surface on the right side view equal the number of points entered for a particular surface on the front view, the topological description of that surface is completed and an isometric drawing of that surface is projected. Thereafter, another surface is encoded. In the computer, there are compared encoded vertex points to all previously entered points to determine if a new point is within a small error distance of any other point. If it is, then the new vertex point is to be replaced with the previously entered point in the topological map. After an object is completely encoded, in accordance with the process, the orthographic view of the solid object can be rotated for inspection. To determine whether the solid is perfectly encoded, a hidden line test can be made. In this connection, if hidden lines can be eliminated, the vertex list and the topological map are usually correct and complete. The use of the order in which points are entered to construct the topological map and to associate coordinates of points between the front and side views enables complete freedom in the type of polyhedra which can be encoded and the type of graphic material being traced. The process can, therefore, be employed to calculate coordinates and the tedious work of writing down the vertex list and the topological map is eliminated. The process is particularly applicable in numerical control techniques.

ERRATA

In the notices of Defensive Publications appearing on pages 9–12 in the Official Gazette of June 3, 1975, the names of the assignees were omitted and should be added as indicated below:

T935,001. E. I. du Pont de Nemours and Company, Wilmington, Del.
T935,002. Pacific Lighting Service Co., Los Angeles, Calif.
T935,003. International Business Machines Corporation, Armonk, N.Y.
T935,004. International Business Machines Corporation, Armonk, N.Y.
T935,005. International Business Machines Corporation, Armonk, N.Y.
T935,006. E. I. du Pont de Nemours and Company, Wilmington, Del.

In the notices of Defensive Publications appearing on pages 7 and 8 in the Official Gazette of July 1, 1975, the following names of assignees were omitted and should be added:

T936,001. E. I. du Pont de Nemours and Company, Wilmington, Del.
T936,002. E. I. du Pont de Nemours and Company, Wilmington, Del.
T936,005. Du Pont of Canada Limited, Quebec, Canada

PROCESS FOR THE INTERACTIVE DESIGN OF POLYHEDRA

Original Filed Dec. 26, 1972 38 Sheets-Sheet 1

PROCESS FOR THE INTERACTIVE DESIGN OF POLYHEDRA

Original Filed Dec. 26, 1972 38 Sheets-Sheet 2

PROCESS FOR THE INTERACTIVE DESIGN OF POLYHEDRA

Original Filed Dec. 26, 1972 38 Sheets-Sheet 3

PROCESS FOR THE INTERACTIVE DESIGN OF POLYHEDRA

Original Filed Dec. 26, 1972 38 Sheets-Sheet 4

PROCESS FOR THE INTERACTIVE DESIGN OF POLYHEDRA

Original Filed Dec. 26, 1972 38 Sheets-Sheet 5

PROCESS FOR THE INTERACTIVE DESIGN OF POLYHEDRA

Original Filed Dec. 26, 1972 38 Sheets-Sheet 6

PROCESS FOR THE INTERACTIVE DESIGN OF POLYHEDRA

Original Filed Dec. 26, 1972

PROCESS FOR THE INTERACTIVE DESIGN OF POLYHEDRA

Original Filed Dec. 26, 1972

PROCESS FOR THE INTERACTIVE DESIGN OF POLYHEDRA

Original Filed Dec. 26, 1972

PROCESS FOR THE INTERACTIVE DESIGN OF POLYHEDRA

Original Filed Dec. 26, 1972

PROCESS FOR THE INTERACTIVE DESIGN OF POLYHEDRA

Original Filed Dec. 26, 1972 38 Sheets-Sheet 14

PROCESS FOR THE INTERACTIVE DESIGN OF POLYHEDRA

Original Filed Dec. 26, 1972 38 Sheets-Sheet 16

PROCESS FOR THE INTERACTIVE DESIGN OF POLYHEDRA

Original Filed Dec. 26, 1972 38 Sheets-Sheet 18

PROCESS FOR THE INTERACTIVE DESIGN OF POLYHEDRA

Original Filed Dec. 26, 1972 38 Sheets-Sheet 19

PROCESS FOR THE INTERACTIVE DESIGN OF POLYHEDRA

Original Filed Dec. 26, 1972 38 Sheets-Sheet 21

PROCESS FOR THE INTERACTIVE DESIGN OF POLYHEDRA

Original Filed Dec. 26, 1972 38 Sheets-Sheet 23

PROCESS FOR THE INTERACTIVE DESIGN OF POLYHEDRA

Original Filed Dec. 26, 1972 38 Sheets-Sheet 26

FROM 442

READ FROM CARD
JK, XS, YS, ZS, FAC
596
I ← 0
598
I ← I + 1
600
II ← I + JK
602
XC ← X(I)/FAC + XS
YC ← Y(I)/FAC + YS
ZC ← Z(I)/FAC + ZS
604
WRITE ON PRINTER
AND PUNCH ON CARD
II, XC, YC, ZC
606
IS I > NK ?
608
NO
YES
I ← 0
610
I ← I + 1
612
LSI ← LS(I)
614
J ← 0
616
J ← J + 1
618
KIJ ← K(I, J) + JK
620
WRITE ON PRINTER
AND PUNCH ON CARD
I, J, KIJ
622
IS J > LSI ?
624
NO
YES
IS I > NS ?
626
NO
YES
TO 406

PROCESS FOR THE INTERACTIVE DESIGN OF POLYHEDRA

Original Filed Dec. 26, 1972 38 Sheets-Sheet 32

PROCESS FOR THE INTERACTIVE DESIGN OF POLYHEDRA

Original Filed Dec. 26, 1972 38 Sheets-Sheet 33